(12) United States Patent
Fludger

(10) Patent No.: US 9,419,726 B2
(45) Date of Patent: Aug. 16, 2016

(54) CLOCK RECOVERY FOR OPTICAL TRANSMISSION SYSTEMS

(75) Inventor: Christopher Fludger, Nuremberg (GB)

(73) Assignee: Cisco Technology, Inc., San Jose, CA (US)

(*) Notice: Subject to any disclaimer, the term of this patent is extended or adjusted under 35 U.S.C. 154(b) by 461 days.

(21) Appl. No.: 13/322,938

(22) PCT Filed: Jul. 16, 2010

(86) PCT No.: PCT/IB2010/053252
§ 371 (c)(1),
(2), (4) Date: Nov. 29, 2011

(87) PCT Pub. No.: WO2011/010259
PCT Pub. Date: Jan. 27, 2011

(65) Prior Publication Data
US 2012/0121274 A1 May 17, 2012

(30) Foreign Application Priority Data
Jul. 23, 2009 (GB) .................................. 0912881.0

(51) Int. Cl.
*H04B 10/06* (2006.01)
*H04B 10/61* (2013.01)
*H04L 25/03* (2006.01)

(52) U.S. Cl.
CPC ............ *H04B 10/6165* (2013.01); *H04B 10/61* (2013.01); *H04B 10/611* (2013.01); *H04B 10/614* (2013.01); *H04L 25/03057* (2013.01)

(58) Field of Classification Search
CPC .. H04B 10/61; H04B 10/611; H04B 10/6165; H04L 25/03038; H04L 27/223; H04L 2025/03477; H04L 7/033; H04L 7/0062; H04L 7/0029; H04L 25/4917; H04L 2025/0349; H04L 2025/03363
See application file for complete search history.

(56) References Cited

U.S. PATENT DOCUMENTS 6,650,699 B1  11/2003  Tierno
6,680,681 B1 * 1/2004  Hsu et al. ..................... 341/144

(Continued)

FOREIGN PATENT DOCUMENTS

CN  101369851  2/2009
EP  0924892 A2  6/1999

(Continued)

OTHER PUBLICATIONS

Combined Search & Examination Report corresponding to counterpart British Patent Application No. GB1503768.2, dated Mar. 18, 2015, 5 pages.

(Continued)

*Primary Examiner* — Ken N Vanderpuye
*Assistant Examiner* — David Lambert
(74) *Attorney, Agent, or Firm* — Edell, Shapiro & Finnan, LLC

(57) ABSTRACT

A receiver for an optical communications system which corrects distortion of a received signal. A clock recovery system utilizing a feedback and feedforward system are provided. The feedback loop comprises a phase detector and a clock source, while the feedforward loop comprises the phase detector and a delay element for delaying the output of distortion correction system. The feedback loop has a significantly lower bandwidth than the feedforward path. There are also provided methods of optimizing tap weights and of acquiring initial tap weights.

30 Claims, 19 Drawing Sheets

(56) References Cited

U.S. PATENT DOCUMENTS

| | | | |
|---|---|---|---|
| 7,606,498 B1 * | 10/2009 | Wu et al. | 398/152 |
| 2003/0137765 A1 * | 7/2003 | Yamazaki et al. | 360/39 |
| 2008/0056403 A1 * | 3/2008 | Wilson | 375/268 |

FOREIGN PATENT DOCUMENTS

| | | | |
|---|---|---|---|
| EP | 0952712 | A2 | 10/1999 |
| EP | 0952712 | | 7/2002 |
| EP | 2086158 | A1 * | 8/2009 |
| WO | 9628918 | | 9/1996 |

OTHER PUBLICATIONS

Office Action in counterpart Chinese Application No. 201080029095.X, mailed Jun. 4, 2014.

Examination Report in counterpart European Application No. GB0912881.0, mailed Nov. 3, 2014.

* cited by examiner

US 9,419,726 B2

CLOCK RECOVERY FOR OPTICAL TRANSMISSION SYSTEMS

BACKGROUND

This invention relates to a receiver for an optical communications system, and in particular to clock recovery in a Dual Polarisation Quadrature Phase Shift Keying System.

Two principle forms of modulation are utilised in optical communications systems; Amplitude Shift Keying (ASK) and Phase Shift Keying (PSK), which encode data in the amplitude and phase, respectively, of the transmitted light. Direct detection methods can be utilised to detect and receive ASK signals, but not PSK signals in which the data cannot be recovered from the power envelope of the light. Coherent detection, in which the received light is mixed with an optical Local Oscillator (LO), enables the reception of PSK signals.

The optical LO may be locked to the frequency and phase of the incoming optical signal (homodyne reception), or, may be held very close to, but not locked precisely to, the incoming optical signal (intradyne reception), or may be at a significantly different frequency in relation to the incoming optical signal (heterodyne reception). Locking an optical LO to an incoming signal for a homodyne system presents many practical difficulties in the optical implementation, while heterodyne reception requires the use of high frequency electronics to remove the frequency offset. Intradyne reception offers a compromise where control of the optical LO is relatively easy to achieve, and the bandwidth of the electrical signal is kept to frequencies which are also relatively simple to manage and process.

A particular form of PSK is Quadrature PSK (QPSK) in which two bits are encoded per symbol. The symbol rate of a QPSK signal is thus half the bit rate carried by the signal. FIG. 1 shows power 10 and electrical field 11 eyes of a QPSK signal. As can be seen, the optical power of each symbol is the same, with the information residing in the optical phase of the signal. Variations in the optical power envelope are caused by transitions between symbols and do not convey any information.

Light sources used for optical transmission systems are generally well-polarised lasers. Independently modulated sources can thus be polarisation multiplexed for transmission, thereby transmitting four bits per symbol at a single wavelength in a Dual Polarisation QPSK (DP-QPSK) format. In a DP-QPSK signal the power and field eyes shown in FIG. 1 are repeated independently, although usually aligned in time at the transmitter, on each polarisation.

A DP-QPSK optical signal is conveniently generated from 4 independent data signals, each at the symbol rate. A 40 Gb/s DP-QPSK signal can thus be generated from four 10 Gb/s electrical signals, thereby utilising relatively cheap 10 Gb/s electrical components. FIG. 2 shows a schematic diagram of a DP-QPSK modulator driven by four signals 20-23, at the symbol rate.

FIG. 3 shows an example of a receiver for receiving a DP-QPSK signal. The received signal 30 is split into two orthogonal polarisations by polarisation beam splitter 31 and each signal is fed to a 90° optical hybrid 32, 33. An optical LO 34 is also fed to each hybrid 32, 33 for mixing with the data signals. The outputs of each hybrid are passed to separate photodetectors 35a, b, c, d to convert their amplitudes to electrical signals which are converted to digital values by Analogue to Digital Converters (ADCs) 36a, b, c, d. Those values are passed to ASIC 37 for digital signal processing.

The outputs from the photodiodes can be expressed as shown below.

$$V_{x0} = |E_{sx} + E_{LO}|^2 = |E_{sx}|^2 + |E_{LO}|^2 + 2\Re_e\{E_{sx}E_{LO}^*\}$$

$$V_{x90} = |E_{sx} + jE_{LO}|^2 = |E_{sx}|^2 + |E_{LO}|^2 + 2\Im_m\{E_{sx}E_{LO}^*\}$$

$$V_{y0} = |E_{sy} + E_{LO}|^2 = |E_{sy}|^2 + |E_{LO}|^2 + 2\Re_e\{E_{sy}E_{LO}^*\}$$

$$V_{y90} = |E_{sy} + jE_{LO}|^2 = |E_{sy}|^2 + |E_{LO}|^2 + 2\Im_m\{E_{sy}E_{LO}^*\}$$

The first two terms on the right in each equation are small, or can be removed by electrical components, leaving the detected signals represented by the right hand term on each line. Each of the electrical signals passed to ASIC 37 thus represent a combination of the data signal and the optical LO. The ASIC must therefore remove the residual LO from the signals to enable decoding of the data.

Optical signals suffer distortion during their transmission, for example due to Chromatic dispersion. It is known that Finite Impulse Response (FIR) filters are effective at removing linear dispersions such as Chromatic Dispersion (CD) (see, for example, J. H. Winters, "Equalization in Coherent Lightwave Systems Using a Fractionally Spaced Equalizer", JLT, Vol. 8, No. 10, October 1990 and Taylor, M. (2004), 'Coherent detection method using DSP for demodulation of signal and subsequent equalization of propagation impairments', Photonics Technology Letters, IEEE 16(2), 674-676.), both of which are incorporated herein by reference. FIG. 4 shows a simplified block diagram of a receiver for a single polarisation utilizing an FIR filter 40 to correct distortion and a carrier recovery block 41 to remove the residual LO offset signal.

After correction by the FIR filter 40 the symbols are discrete, but located at arbitrary phases (as shown at 42) due to the LO offset. The carrier recovery block 41 removes that offset resulting in the phases lying on the expected constellation 43 for a QPSK signal.

FIG. 5 shows an example configuration of a FIR filter 40, implemented as is known in the art.

During transmission the polarisation of the optical signal is rotated and may be received in any arbitrary alignment, not necessarily aligned with the receiver as has been assumed above. A butterfly structure of FIR filters may be utilised to process the received signals when the polarisation is in an unknown state. FIG. 6 shows a filter structure for performing this demultiplexing as described in, for example, Savory et al., "Digital Equalisation of 40 Gbit/s per Wavelength Transmission over 2480 km of Standard Fibre without Optical Dispersion Compensation", ECOC2006, Paper 2.5.5, 2006, incorporated herein by reference.

FIG. 7 shows a block diagram of a digital receiver system for an optical communications system. As explained above, the input signal 70 is mixed with a local oscillator in block 32 and fed to a set of four photodiodes 35. The outputs of the photodiodes are digitised in ADCs 36, the output being passed to a digital processing system 71. The digital processing system 71 is typically provided by a CMOS Application Specific Integrated Circuit (ASIC) specifically designed to process the digitised signals including an equaliser 74 to correct distortion, but may be any system suitable for performing the tasks required, for example a DSP may be appropriate. The processing system processes the data in real time and therefore must be capable of operating on the full data payload. For example, a typical receiver may receive a 10-40 Gb/s signal for processing. ASICs provide convenient systems for performing this processing as they allow the design of a highly parallel system to cope with processing such high data rates.

The ADCs and processing system and other components may be provided by a single device, or separated between different devices as appropriate. The same or different type of device may be appropriate for each function.

The data clock frequency and phase of the incoming signal must be derived such that the ADCs can sample the incoming signal at the correct point and sample rate. A conventional approach, as shown in FIG. 7, is to use an analogue Phase Locked Loop (PLL) formed of phase detector 73 and Voltage Controlled Oscillator (VCO) 72. Although not shown explicitly, it will be appreciated that a loop filter will be incorporated in the PLL. It is generally convenient to locate this in close proximity to the VCO and it may therefore be considered to form part of the VCO block 72 in FIG. 7. However, the incoming signal may be so distorted that this system cannot track the signal to acquire the clock phase. For example, the distortion correction may tolerate 10,000-20,000 ps/nm of dispersion which is significantly higher than conventional analogue PLLs have been shown to work over.

An alternative method shown in FIG. 8 is to utilise a digital phase detector 80 operating from the equalised signals to control the VCO 72. In order to meet certain telecommunications standards (for example G.8251) a PLL bandwidth of greater than 1 MHz may be required. However, the correction system 74 introduces delay into the PLL which affects operation. In particular, gain peaking is introduced making it extremely difficult, if not impossible, to meet the performance required by the standards. The processor may require 10-40 clock cycles to perform the equalisation process and typically operates at 300-600 MHz giving 30-100 ns of delay in the feedback loop which is sufficient to degrade the performance of a 1 MHz PLL. FIG. 9 shows a Jitter mask demonstrating the effect of delay on the PLL of FIG. 8 with a 1 MHz bandwidth. Performance is reduced to below the required level even with 16 clock cycles of delay in the loop. In contrast, in similar implementations in the radio domain the processing rate is far higher than the data rate, making the delay less significant to the operation of the feedback loop.

There is therefore a requirement for a clock recovery system that can perform clock recovery from a highly distorted signal, such as an uncompensated DP-QPSK signal.

The startup of an optical transmission system receiver may be difficult, or impossible. The clock recovery and compensation systems are inter-dependent and one cannot begin operation without the other being at least partially operational. There is therefore a need for a method which can initialise the receiver in such a system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a receiver for receiving at least one input signal from a photodiode in an optical communications system, comprising an Analogue to Digital Converter (ADC) configured to digitise the at least one input signal and output a digitised signal, a digital processing system configured to process the digitised signal and output a processed signal, a phase detector configured to detect the timing phase of the processed signal and output a signal indicative of that phase, a clock source providing a sampling clock signal to the analogue to digital converter, the clock source having the signal indicative of the phase of the processed signal as an input to control the sampling clock signal, and a delay element configured to delay the processed signal and output a delayed processed signal, the delay of the delay element being controlled by the output of the phase detector.

The processing of the digital signal may comprise correction of distortion introduced in the optical transmission system.

The digital processing system may comprise a Finite Impulse Response (FIR) filter for processing the digitised signal.

The FIR may comprise variable tap weights.

A tap weight update algorithm may be implemented in the processing system.

The receiver may further comprise a low pass filter configured to filter the signal indicative of the phase.

The filtered signal indicative of the phase may be utilised by the delay element, and the unfiltered signal is utilised by the clock source.

The filtered signal indicative of the phase may be utilised by the delay element, and the clock source.

The clock source may be implemented in a device with the at least one ADC.

The clock source may be implemented as a separate device to the at least one ADC.

The at least one ADC and clock source may be implemented in a first device and the processing system is implemented in a second device.

The second device may be an ASIC.

The processing system may process the signals in real time.

The receiver may further comprise at least one photodiode, each providing an input to an ADC.

The receiver may comprise four ADCs.

The receiver may further comprise an optical Local Oscillator and at least one optical hybrid configured to mix the optical Local Oscillator with a received optical signal, the output of the at least one optical hybrid being the input to the at least one photodiode.

The receiver may further comprise a carrier recovery system operating at the output of the digital processing system.

The receiver may further comprise a decision system configured to decide the value of received symbols.

The tap update algorithm may utilise inputs comprising a delayed version of the at least one input signal, the delay being the same as the delay applied by the delay element to the processed signal, the output of the delay element, and the decided symbols.

The phase detector may be configured to select one or both of two signals relating to two polarisations.

The receiver may further comprise a tap weight centralisation system for centralising the tap weights of the FIR filter.

The receiver may be configured to receive, correct and decode a dual polarisation quadrature phase shift keyed optical signal.

There is also provided a method of receiving a modulated optical signal, comprising the steps of receiving the optical signal in at least one photodiode, digitising the output of the photodiode to provide an input signal utilising an ADC, processing the input signal to correct distortion and outputting a corrected signal, monitoring the timing phase of the corrected signal and outputting a phase signal indicative of that phase, utilising the phase signal to control a clock source providing a clock signal to the ADC, and delaying the corrected signal in accordance with the phase signal.

There is also provided a method of optimising tap weights in an FIR filter utilised to correct distortion in an optical communications receiver, comprising the steps of monitoring the tap weight centre of the FIR filter, calculating the offset of tap weight centre from the central tap position of the FIR filter, and utilising that offset to define a sampling clock phase of an ADC, the output of which is passed to the FIR filter.

The sampling clock phase may be defined by adding a signal indicative of the offset to a signal indicative of the phase of a signal output by the FIR filter.

The offset may be utilised to adjust a delay applied to the output of the FIR filter.

There is also provided a method of initially acquiring tap weights for an FIR filter used to correct distortion in an optical communications receiver, the method being performed by the receiver and comprising the steps of acquiring and storing a series of samples of a received signal, and applying a blind optimisation algorithm to the series of samples to obtain an estimate of tap weights for a Finite Impulse Response (FIR) filter of the receiver configured to equalise a received optical signal.

The method may further comprise the step of transferring the series of samples to a digital processing system and performing the blind optimisation in that processing system.

The blind optimisation algorithm may be applied in both forwards and backwards directions to the series of samples.

The method may further comprise the step of transferring the estimated tap weights to the FIR filter.

The method may further comprise the step of commencing correcting distortion in a received signal utilising the FIR filter.

The method may further comprise the step of activating a clock recovery system in the receiver.

The method may further comprise the steps of acquiring and storing a further series of samples of a received signal, and applying a blind optimisation algorithm to the further series of samples to obtain an improved estimate of the tap weights.

The method may further comprise the step of applying the improved tap weights to the FIR filter and utilising those tap weights for correction of distortion in a received signal.

The method may further comprise the step of activating a decision system in the receiver to decode the values represented by a received signal.

The method may further comprise the step of activating a tap update algorithm, said algorithm being configured to optimise the tap weights.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved.

The description sets forth the functions of the example and the sequence of steps for constructing and operating the example. However, the same or equivalent functions and sequences may be accomplished by different examples.

A 40 Gbit/s DP-QPSK transmission system is utilised as the basis for the following description, but the techniques described are applicable to a range of transmission formats and rates without unduly burdensome modification.

Figure 10:
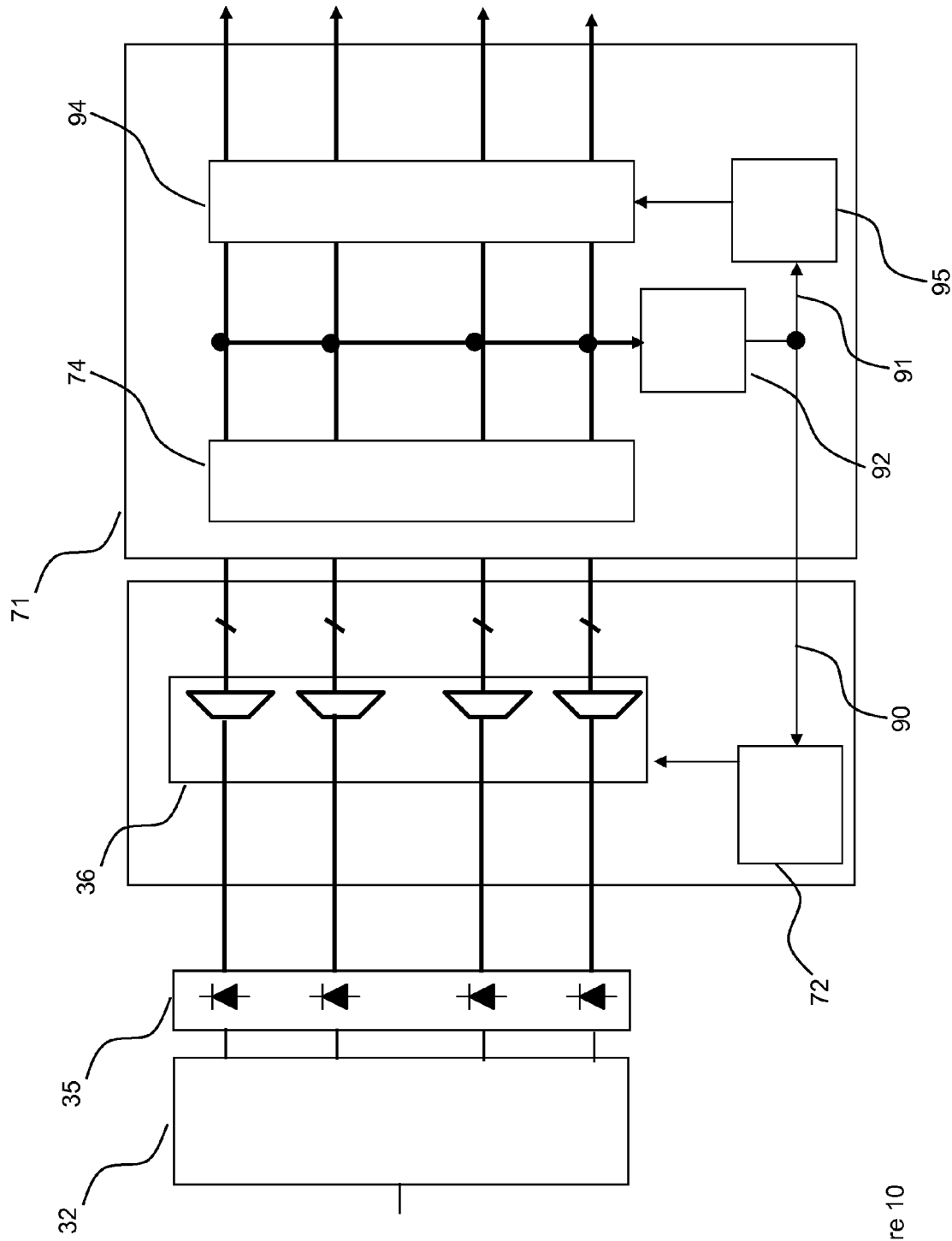
FIG. 10 shows an example of an optical receiver using combined feedback and feed forward signals for clock recovery.

FIG. 10 shows a block diagram of a clock recovery system, using a feedback loop 90 and a feedforward path 91. Phase Detector 92 detects the phase of the output of equaliser 74. The phase detector 92 output is fed back to Voltage Controlled Oscillator (VCO) 72 which provides a clock for the Analogue to Digital Converter (ADC) 36 sampling. The VCO 72, ADCs 36, equaliser 74 and phase detector 92 form a Phase Locked Loop (PLL). The phase detector 92 output is also fed forward to digital delay element 94 which acts to delay the samples output from the equaliser 74. The digital delay element 94 provides a time adjustment function acting on the samples passed to that element. The digital delay element 94 can be implemented using an interpolator, for example as described in H. Meyr, M. Moeneclaey, S. A. Fechtel, '*Digital Communication Receivers*', Wiley & Sons, ISBN 0-471-50275-8. Chapter 9, which is incorporated herein by reference.

The PLL has a relatively low bandwidth of the order of 50-100 kHz and removes the frequency offset and slowly varying phase offset from the clock. The low bandwidth of the PLL means that the processing delay of equaliser 74 does not cause significant gain peaking in the feedback loop, as seen when the bandwidth of the PLL is sufficient to also remove the fast varying phase offset.

The delay element 94 removes higher frequency phase jitter remaining on the signals by acting as a digital interpolator to delay the position of the samples output from equaliser 74. The Low pass filter 95 prior to the delay element has a bandwidth of the order of 1-4 MHz.

The Low pass filter may be combined with the phase detector, provided the filter bandwidth is at least about 10 times that of the PLL, such that it effectively only affects the feedforward path. Regardless of whether the low pass filter is incorporated into the phase detector, or is separate, the bandwidth of the external loop should be lower than the bandwidth of the phase detector and delay element 94.

The combination of a lower frequency feedback loop and a delay element controlled by a feedforward signal mitigates at least some of the problems described with prior systems and enables a clock recovery system to meet the required standards.

Figure 11:
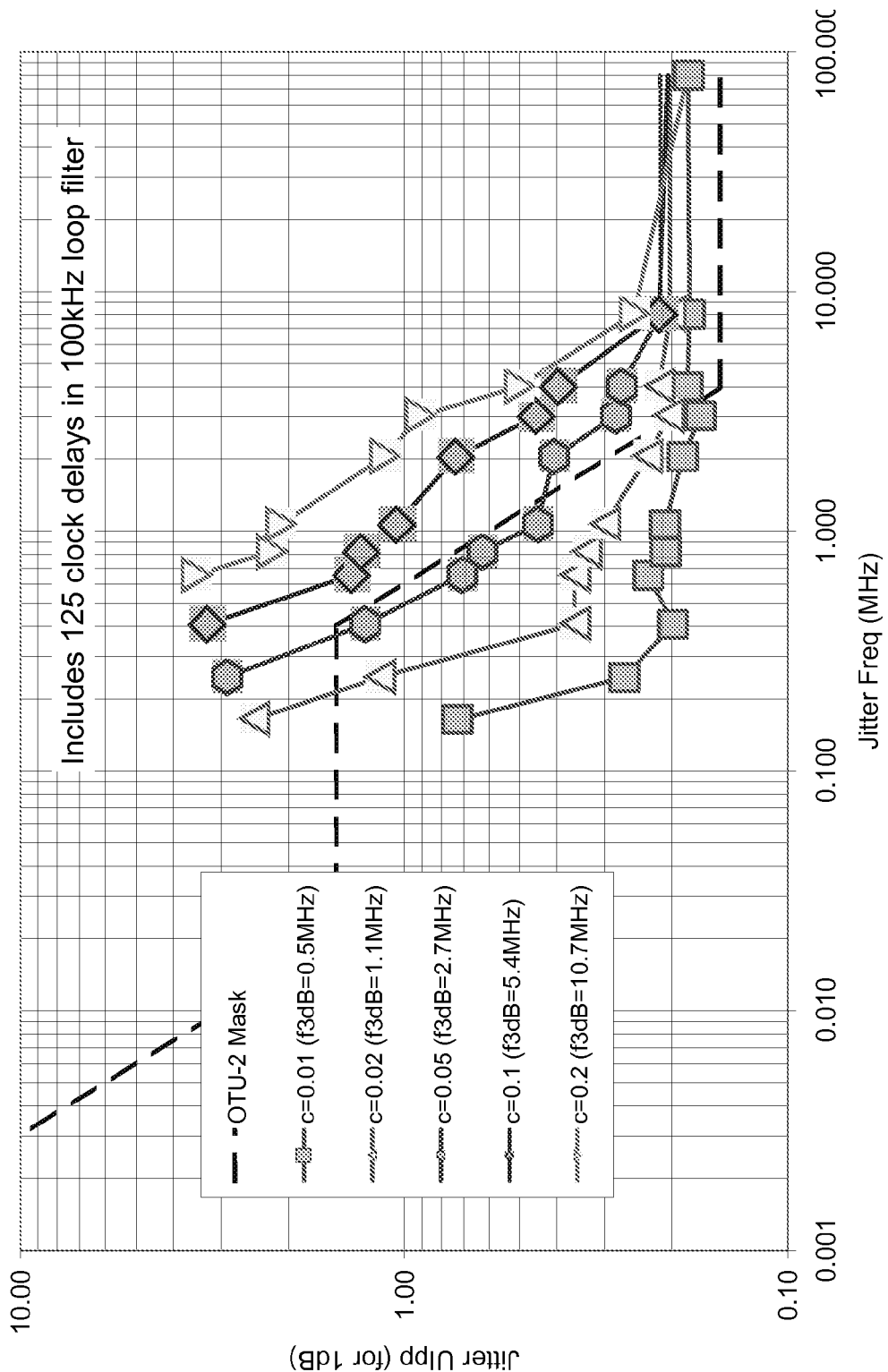
FIG. 11 shows a jitter mask.
Figure 12:
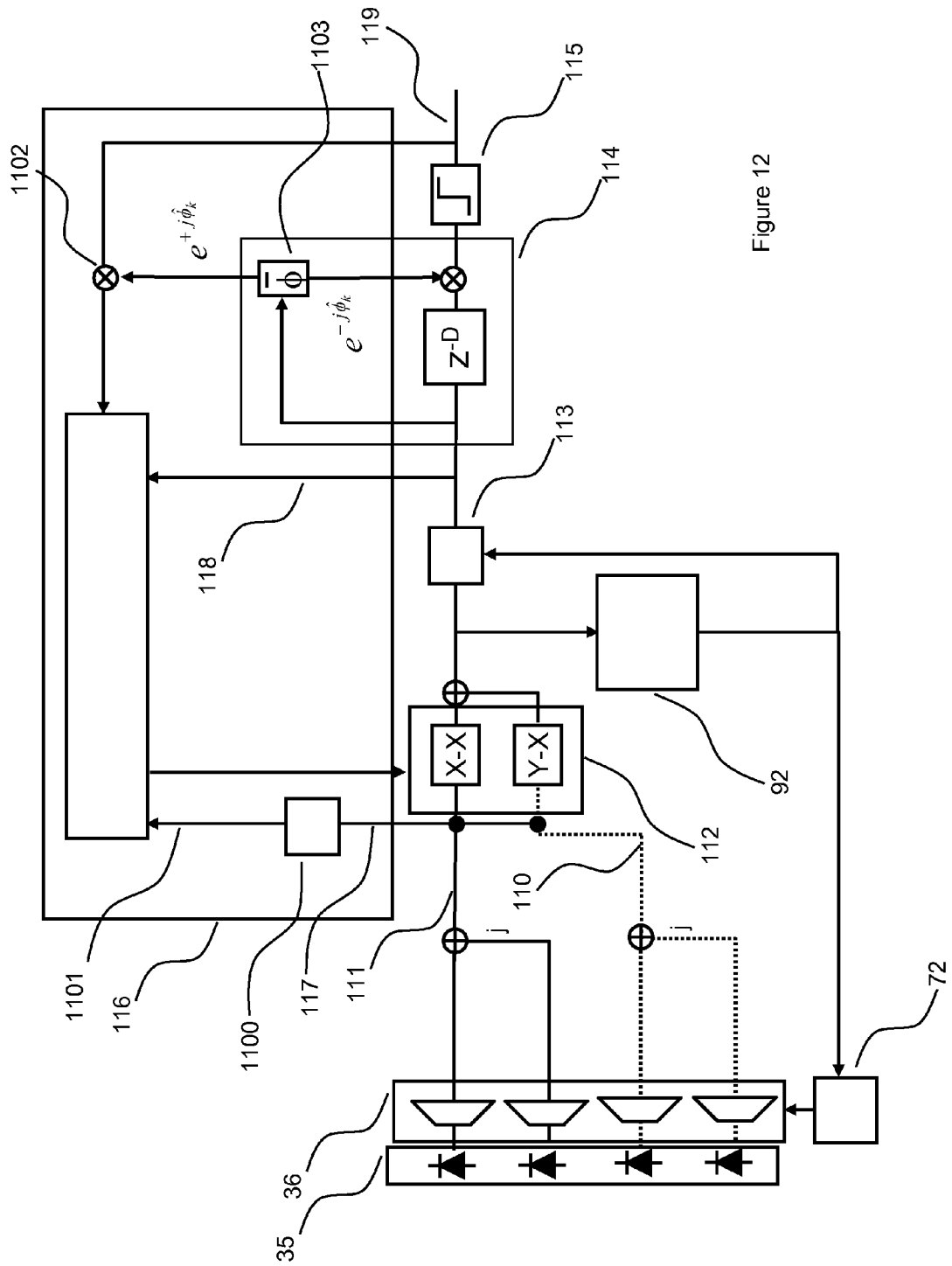
FIG. 12 shows a block diagram of an optical communications receiver.

FIG. 11 shows the G.8251 Jitter mask and a series of plots for the system of FIG. 10. Dashed line 100 marks the minimum jitter values which must be tolerated. The simulation assumed a processing delay of 372 ns (125 clock cycles), and a 100 kHz analogue closed-loop bandwidth. Even with this relatively large processing delay, the standard can be comfortably met with a Low Pass Filter with a 5.4 MHz 3 dB point. FIG. 12 shows a block diagram of a receiver system for correcting distortion, performing clock recovery, and decoding received data. The system shown in FIG. 12 relates to a single polarisation and is duplicated (apart from the photodiodes and ADCs which are shared) for the second polarisation.

Figure 1:
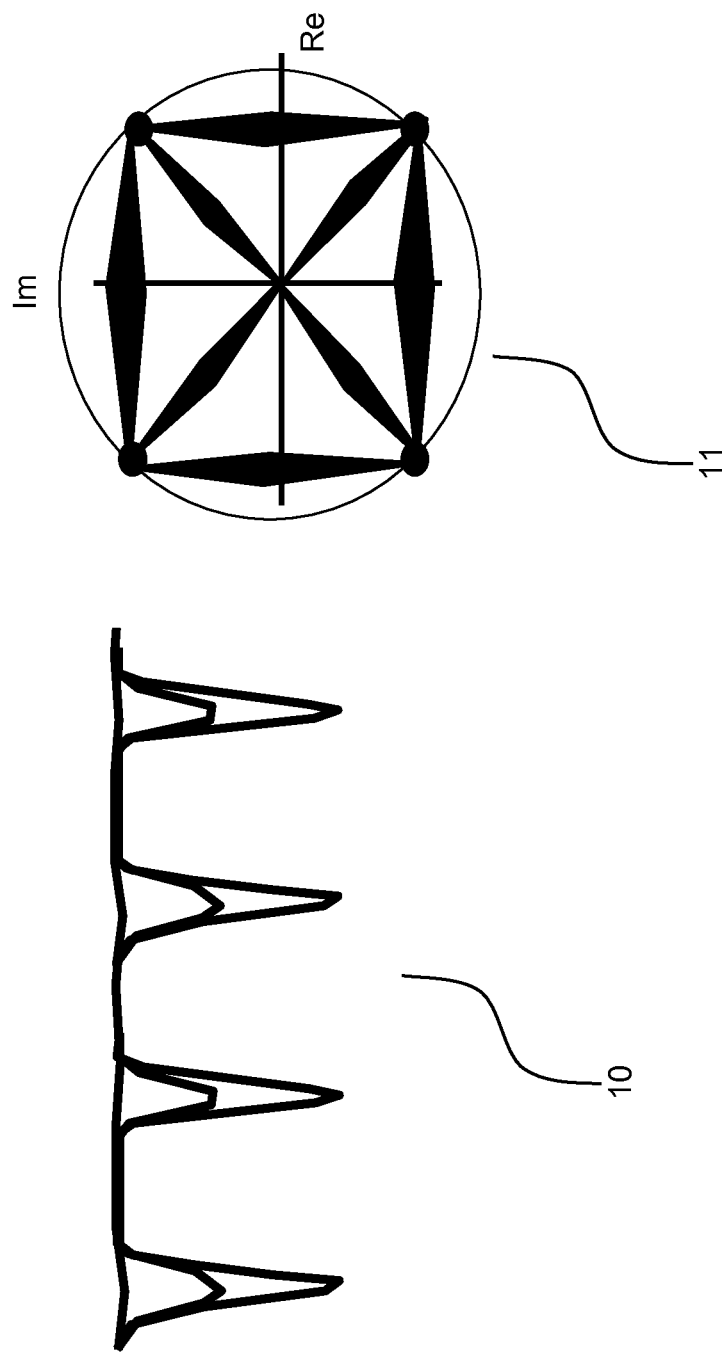
FIG. 1 shows power and phase eyes for a QPSK signal.
Figure 2:
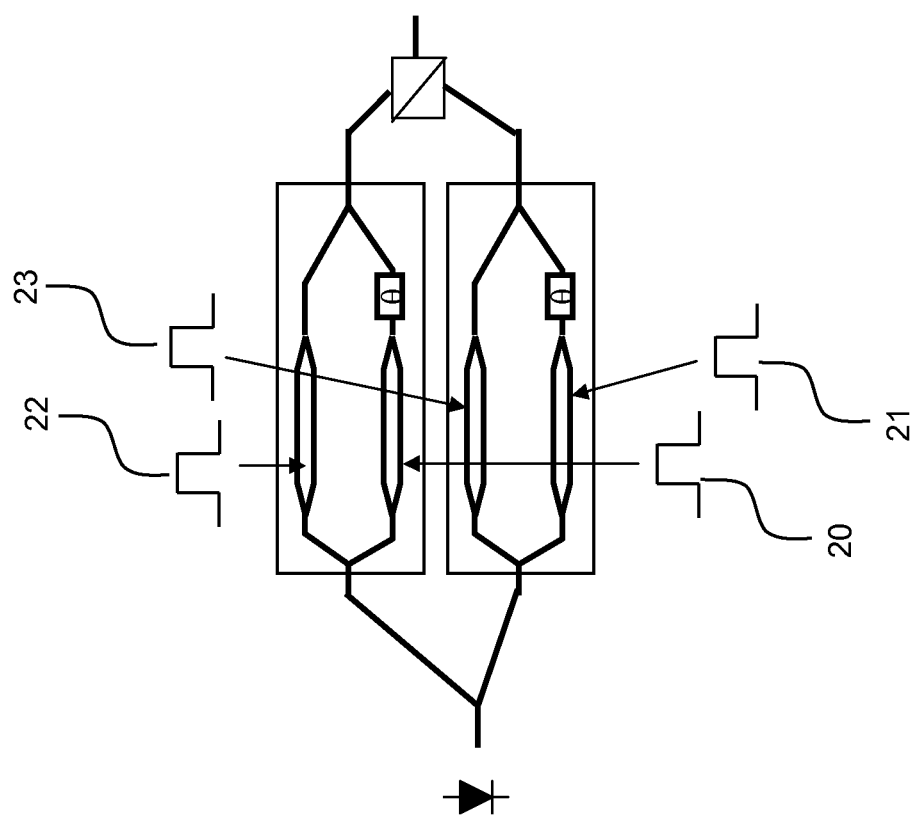
FIG. 2 shows an example QPSK transmitter.
Figure 3:
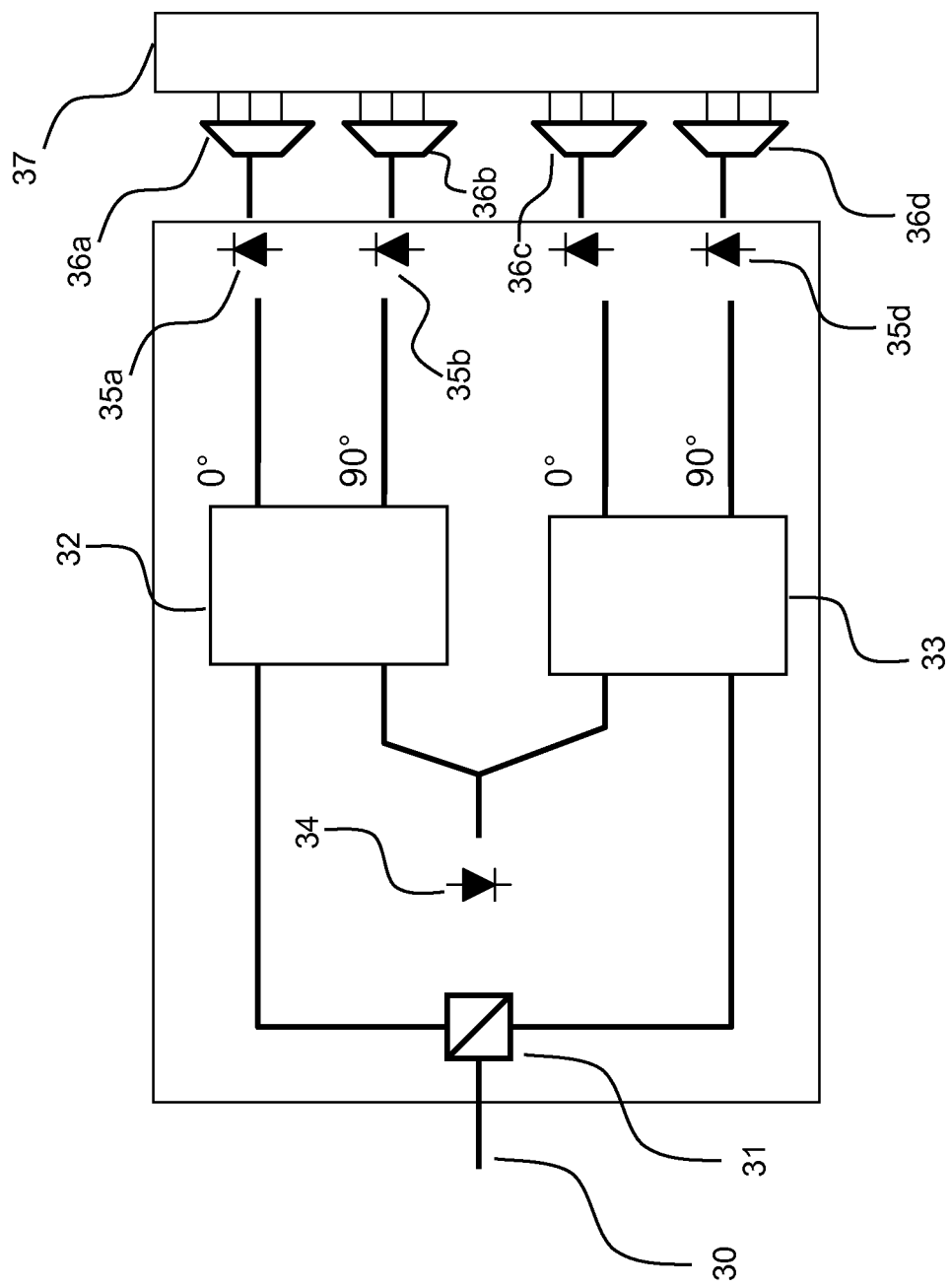
FIG. 3 shows part of a coherent receiver.
Figure 4:
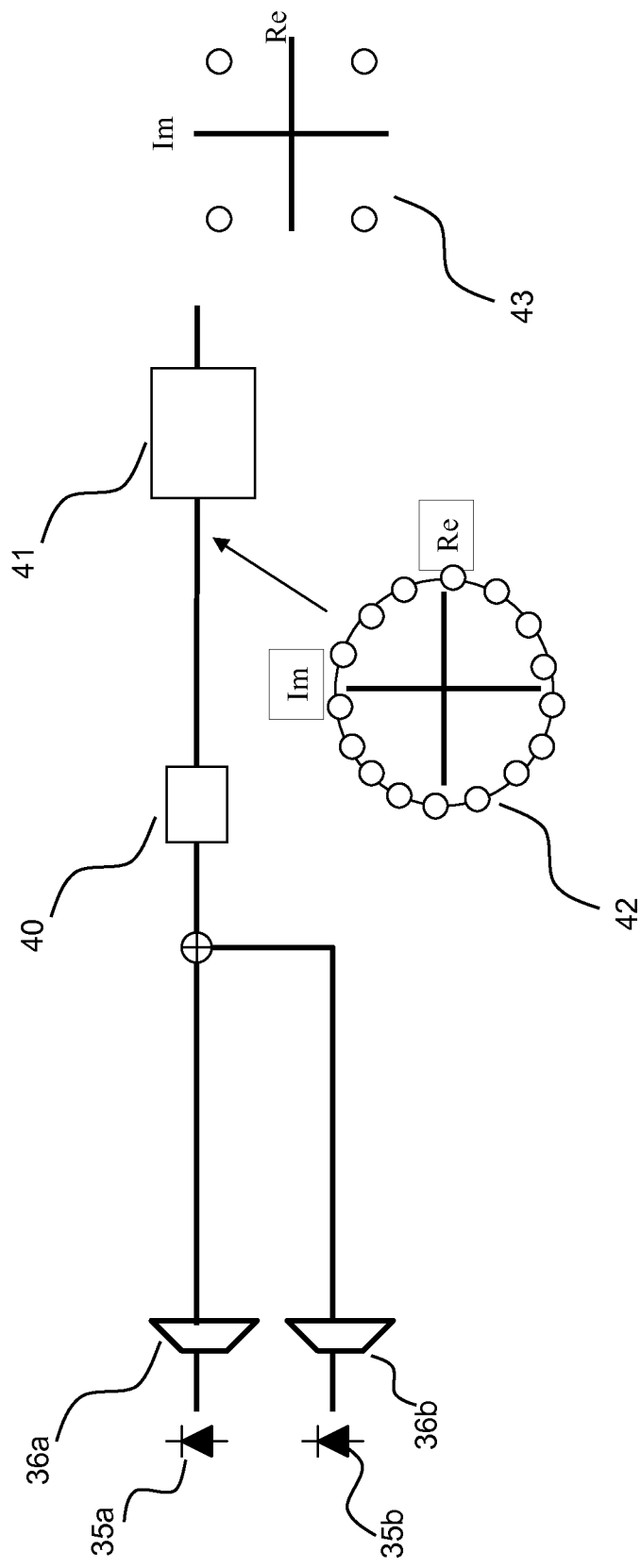
FIG. 4 shows a block diagram of a digital receiver for an optical communications system.
Figure 5:
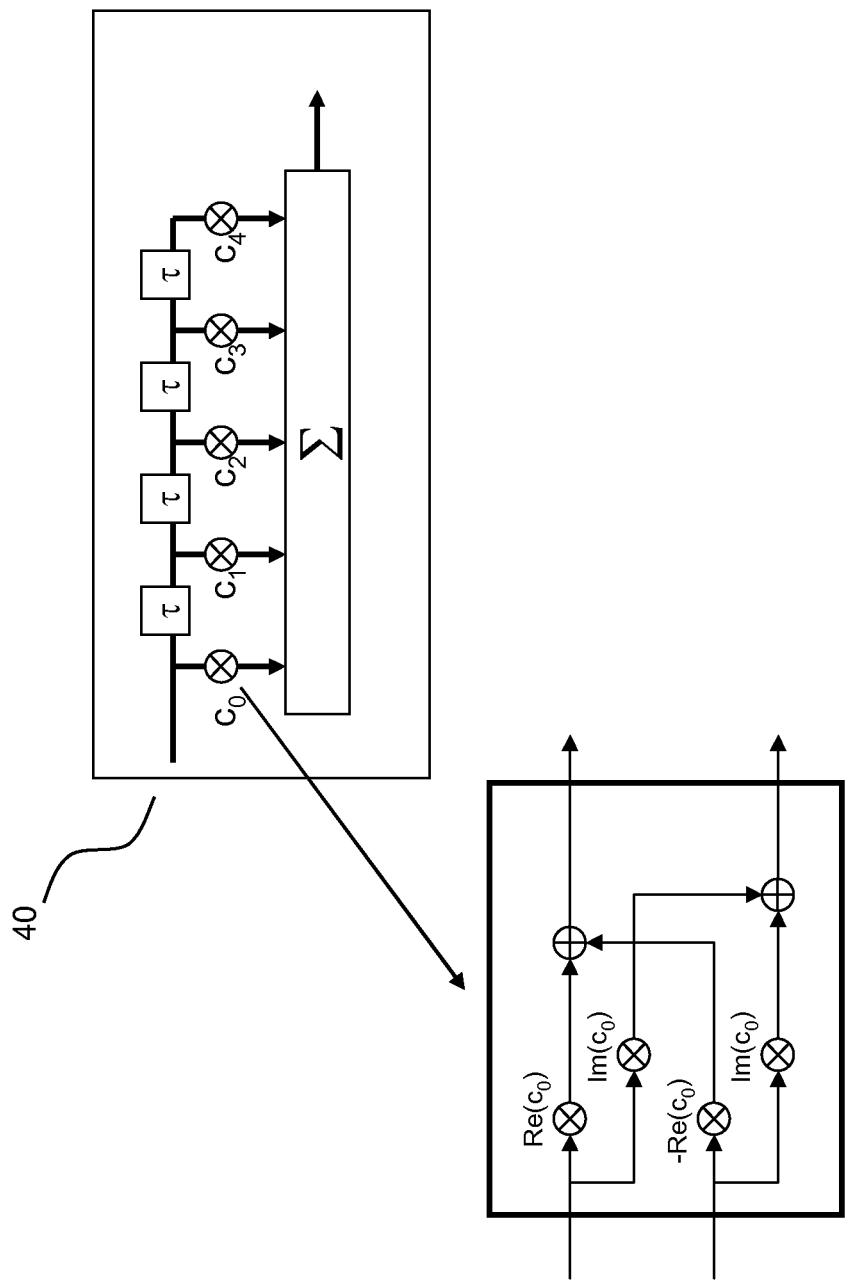
FIG. 5 shows an example of an FIR filter.
Figure 6:
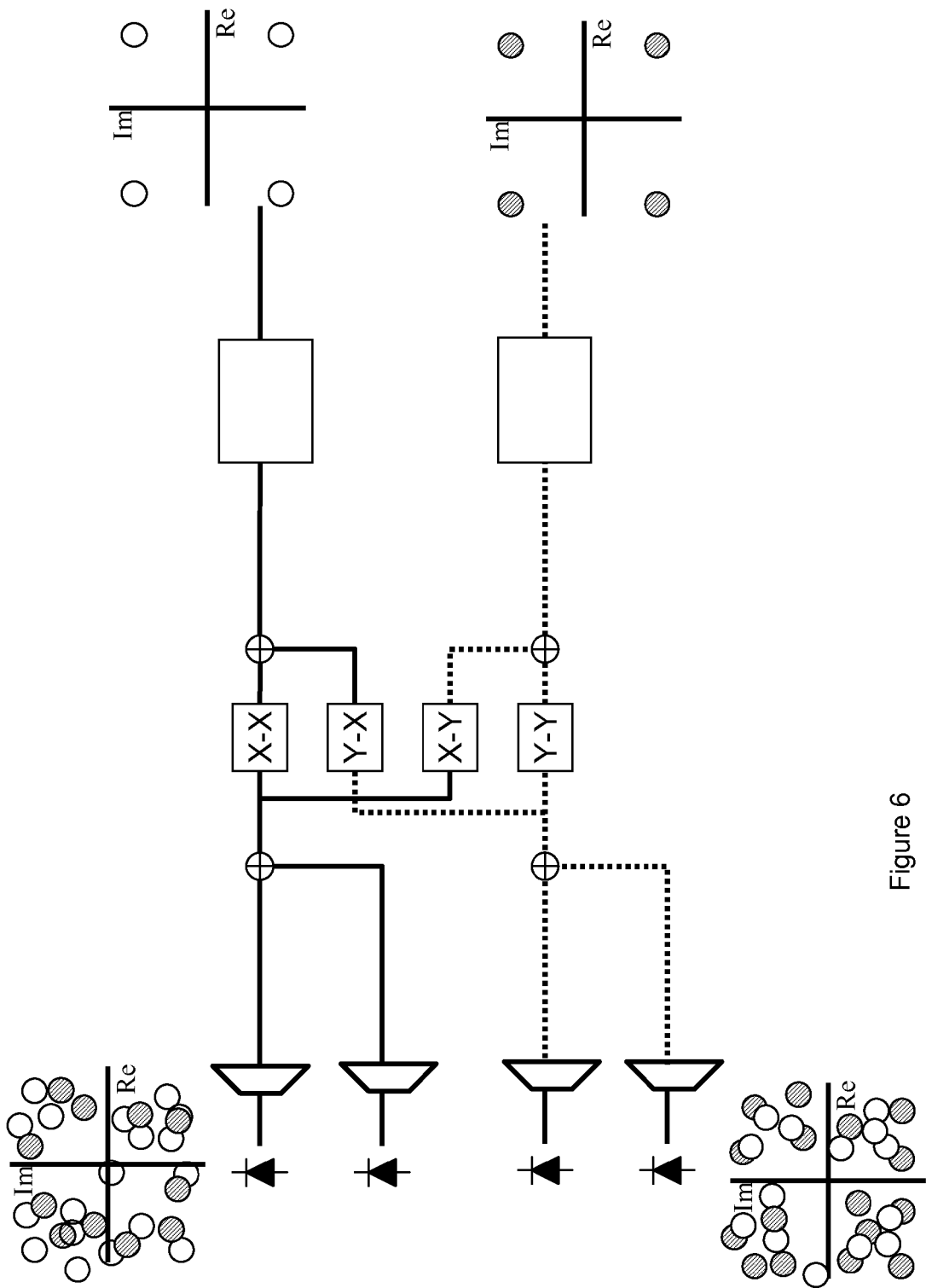
FIG. 6 shows an example of a receiver for a dual polarisation system.
Figure 7:
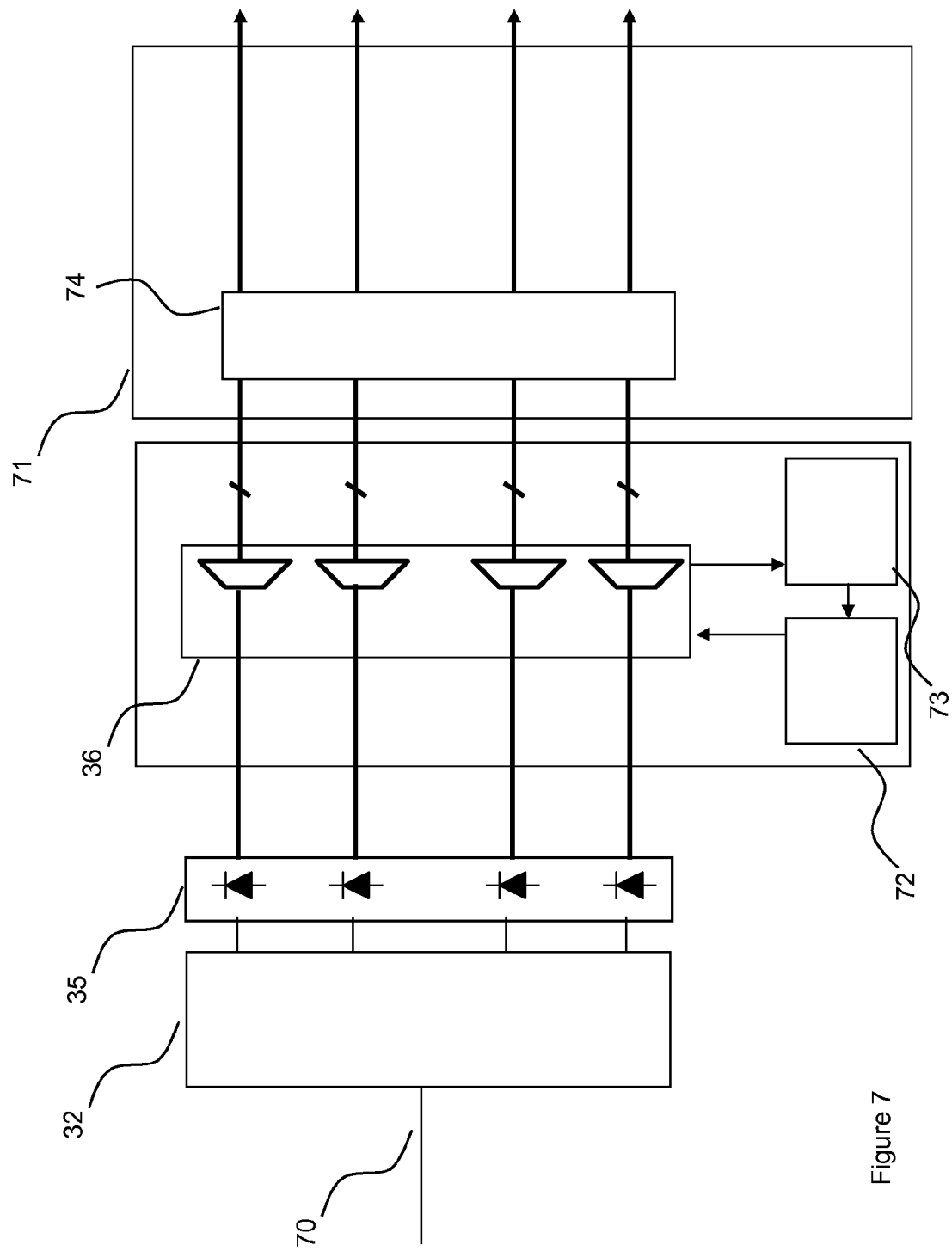
FIG. 7 shows a block diagram of a receiver using an analogue phase lock loop.
Figure 8:
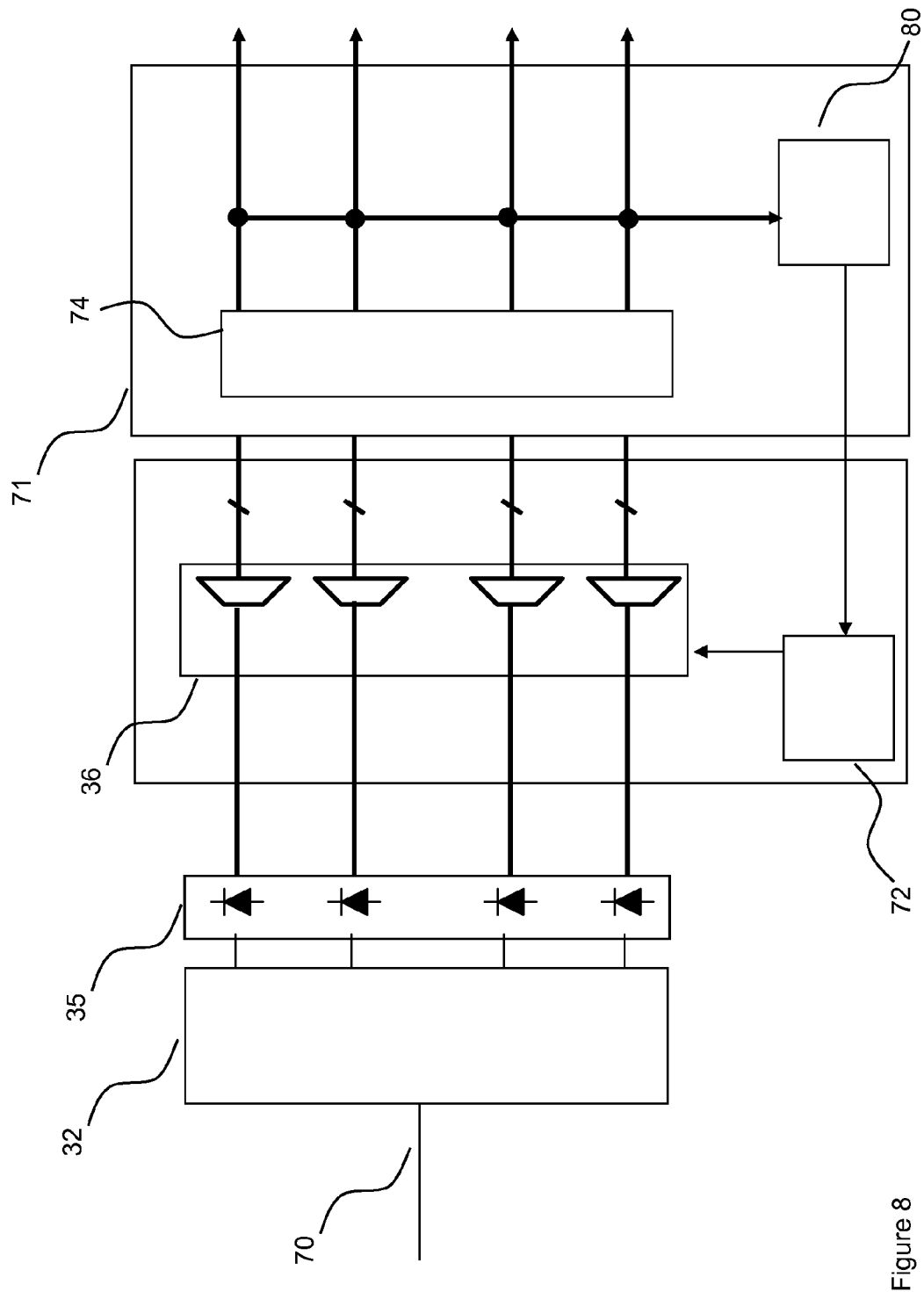
FIG. 8 shows a block diagram of a receiver using a combined digital and analogue phase lock loop.
Figure 9:
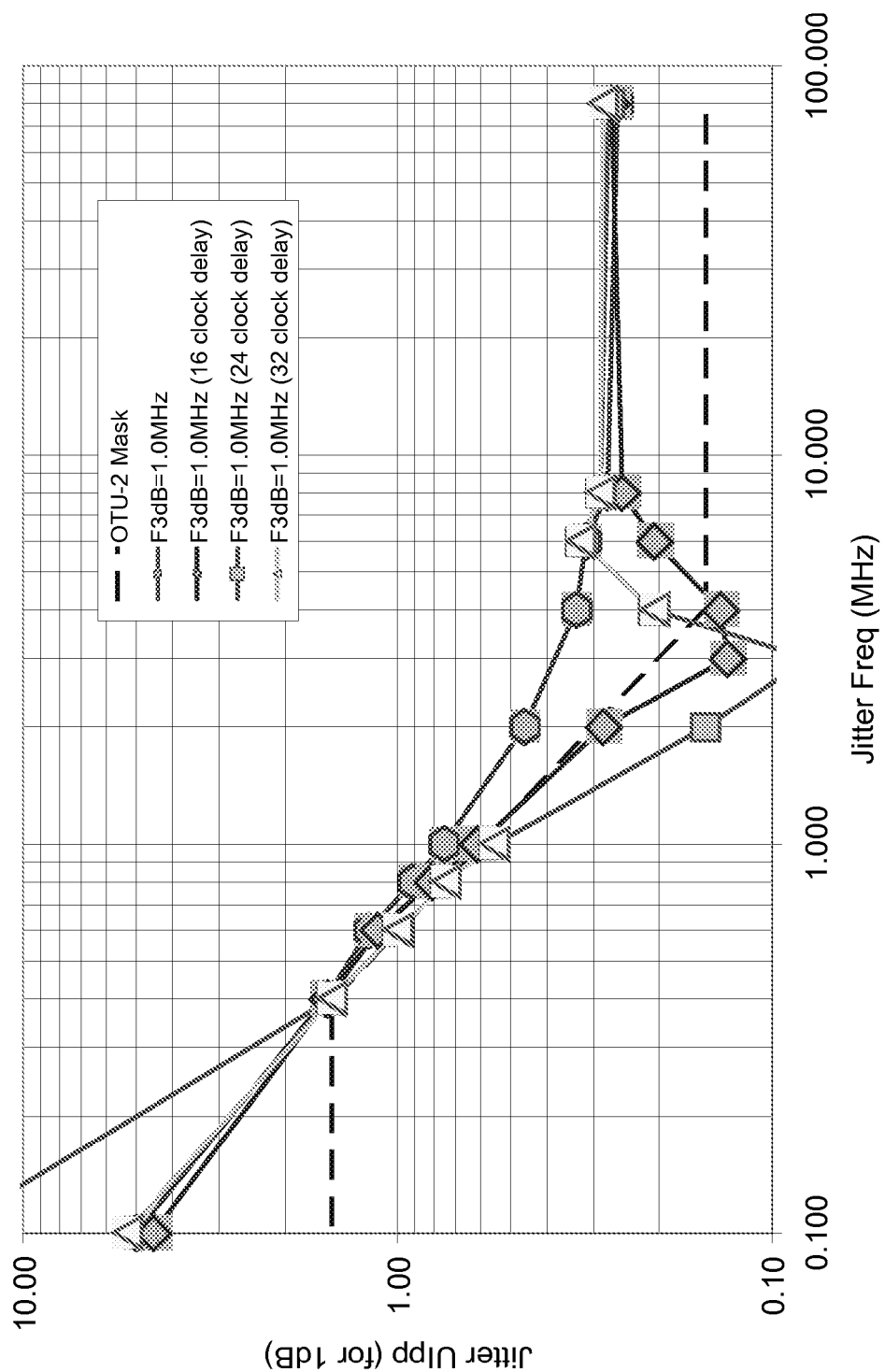
FIG. 9 shows a Jitter mask demonstrating the effect of delay on the feedback loop of FIG. 8 with a 1 MHz bandwidth.

As explained previously, four photodiodes 35 receive four outputs from 90° hybrids mixing the optical signal with the optical Local Oscillator. The outputs of those photodiodes are digitised using ADCs 36, the sampling clock of which is provided by VCO 72 configured in conjunction with phase detector 92 as described in relation to FIG. 8.

The upper pair of photodiodes (solid signal lines) are for a first output of the polarisation splitter described above and the lower pair (dashed signal lines) for the second output of that splitter. The signals from each pair are combined to give a complex valued signal (composing of real and imaginary parts) 110, 111 and passed to the equaliser 112. As explained previously, the 'butterfly' equaliser structure corrects for the unknown polarisation of the incoming optical signal.

Delay element 113 acts on the output of the equaliser 112 to remove any high frequency phase jitter not tracked by the PLL. The output of the delay element 113 is passed to a carrier recovery system 114 to remove the Local Oscillator offset. Example carrier recovery systems are disclosed in Viterbi, A. (1983), '*Nonlinear estimation of PSK-modulated carrier phase with application to burst digital transmission*', *Information Theory, IEEE Transactions on* 29(4), 543-551, and H. Meyr, M. Moeneclaey, S. A. Fechtel, '*Digital Communication Receivers*', Wiley & Sons, ISBN 0-471-50275-8. pp. 311-322, which are incorporated herein by reference.

Decision circuit 115 decides values of the symbols (in this example DP-QPSK system the output from the equaliser represents a QPSK signal and therefore each symbol carries two bits) and outputs the decided symbols at 119.

A decision-directed tap update system 116 is provided to control and maintain the tap weights of the equaliser 112 such that the system continuously monitors and tracks the incoming signals. The tap update system 116 operates a tap update algorithm which takes inputs of the input signal 117, the equalised signal 118 and the decided symbols 119. To ensure correlation between the input signal and the equalised signal 118 a second delay element 1100 is utilised on the input signal feed to the tap update system to mimic the delay applied by the first delay element. The input signal passed to the update algorithm is therefore actually a delayed input signal 1101 such that the algorithm does not see the delay introduced by the first delay element 113. The decided symbols signal 119 also differs from the input signal 1101 and equalised data 118 as the carrier offset has been removed. The decided symbols must therefore be 're-spun' such that they correlate with the other signals. This is achieved by applying 1102 the output of the carrier phase estimator 1103 to the decided symbols.

The tap update algorithm may be any suitable algorithm for providing the required functionality, and various options are known in the art. By way of example, the following description is given in relation to a Least Mean Squares (LMS) algorithm.

Firstly, an error vector of the difference between the equaliser output and the decided symbol is calculated as below:—

$$\bar{e}_k = \bar{y}_k - \bar{p}_k$$

We note the use of a line over variables to indicate a complex value, and bold type to indicate a matrix. Where $y_k$ is the decided symbol output:—

$$\bar{y} = \bar{d}(k)e^{+j\hat{\phi}_k}$$

And $p_k$ is the equaliser output:—

$$\bar{p} = \overline{w}^H \overline{v}$$

where H is the Hermitian transpose (or conjugate transpose). The tap coefficients are then calculated:—

$$\overline{w}_{k+1} = (1-\alpha)\overline{w}_k + \mu \bar{e}_k {}^* \bar{v}_k$$

Where $\overline{w}$=tap weight matrix, $\alpha$=leakage factor, $\mu$ is the update rate and $\overline{v}$ is the unequalised input signal matrix. The delayed input signal $\bar{v}_k$ is multiplied by the error value, $\bar{e}_k$, and by $\mu$, the tap update rate. The first terms in the equation apply the 'leakage factor' $\alpha$ to the previous tap weights, which causes them to decay over time.

The receiver system of FIG. 12 thus provides a system for equalising a received signal, performing clock recovery, dynamically updating the equaliser to track changing conditions, and determining the value of the received symbols. As noted previously, a comparable system may be utilised to process the second polarisation of a DP-QPSK system.

Figure 13:
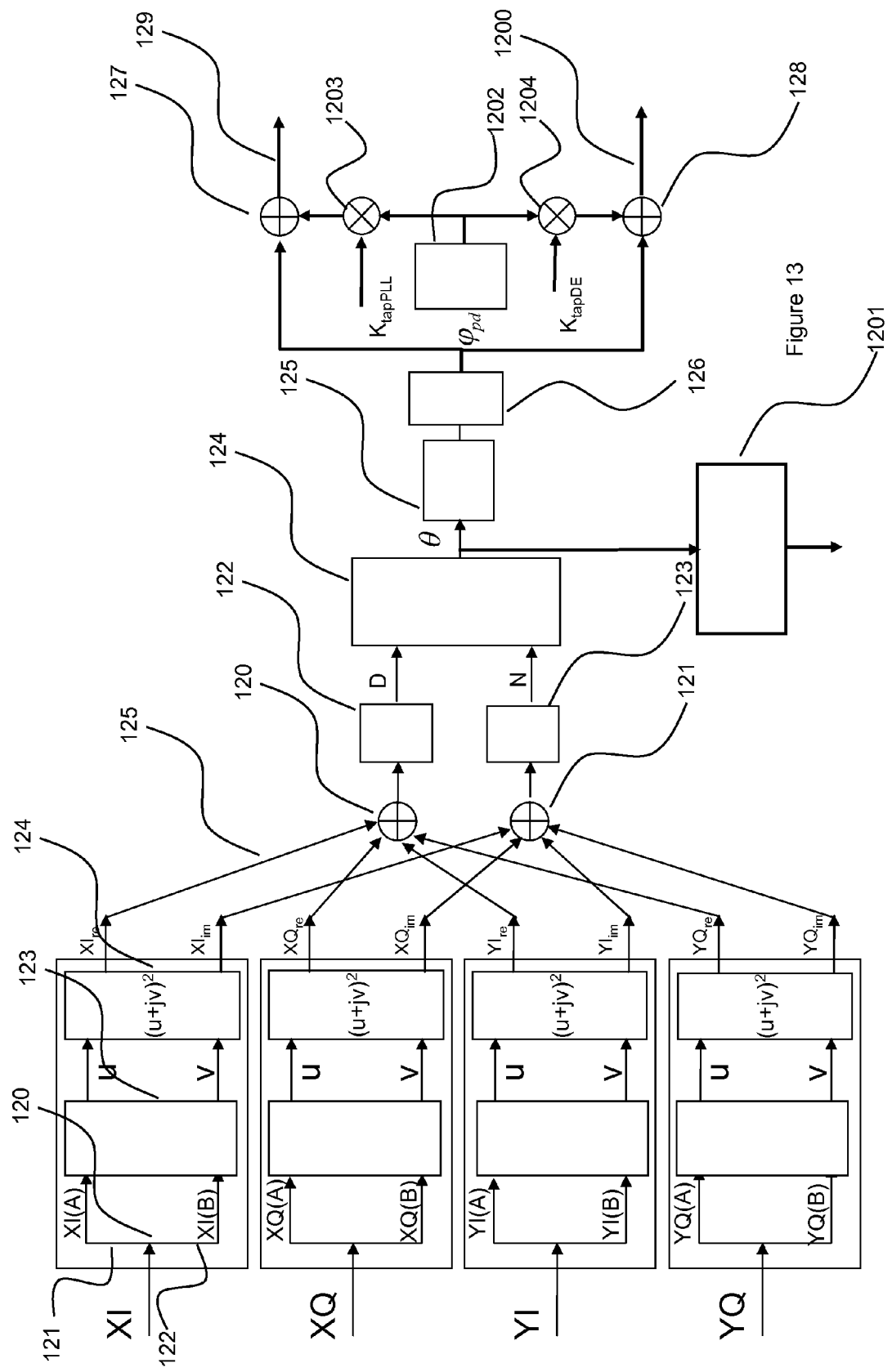
FIG. 13 shows a phase detecting system.

FIG. 13 shows a block diagram of a phase detector suitable for a DP-DQPSK system. The operation of such a phase detector is described in Oerder, H. (May 1988), '*Digital filter and square timing recovery*', *Communications, IEEE Transactions on* 36(5), 605-612 and Zhu, M. S. M. (November 2005), '*Feedforward symbol timing recovery technique using two samples per symbol*', *Circuits and Systems I: Regular Papers, IEEE Transactions on [Circuits and Systems I: Fundamental Theory and Applications, IEEE Transactions on]* 52(11), 2490-2500, incorporated herein by reference.

For clarity, the following description is given in relation to the first signal and blocks shown in FIG. 13, but applies to each of the blocks duplicated in parallel in FIG. 13.

As described in the above references the incoming signal 120 is first multiplied by a half-rate sine or cosine clock. In the implementation shown in FIG. 13 which operates using two samples per symbol, this is implemented by passing alternate samples to separate data paths 121 and 122. Path 121 receives the even (A) samples and path 122 receives the odd (B) samples. Even and odd are used as labels only to distinguish one sub set of samples from the other. The samples are then passed through low pass filter 123, for example a Finite Impulse Response (FIR) filter to remove high frequency components from the signal which would distort the phase detector output when working with 2 samples per symbol. The complex value (u+vj) is then squared at block 124 to give a clock phase vector 125.

The four clock phase vector signals are added in adders 120, 121. Adders 120, 121 are selectable to allow the selection of one or more of the clock phase vector signals. When in steady state it is likely to be most preferable for the phase detector to operate on all signals (i.e. both polarisations) to give the best accuracy. However, during startup, or at other times, it is possible that the output of the equaliser for one polarisation is poor and thus the phase detector may utilise only the good polarisation to detect the phase. The phase detector may therefore be switched dynamically based on the system's performance to utilise one or both of the polarisation signals.

The clock phase vectors are then averaged at blocks 122, 123 and converted to a phase value using an a tan $((\frac{1}{2}\pi)\tan^{-1}(N/D))$ block 124. Averaging the phase vectors rather than the phase value makes the system more robust against cycle slips. The parameters of the Average blocks 122, 123 define the bandwidth of the phase detector.

Figure 14:
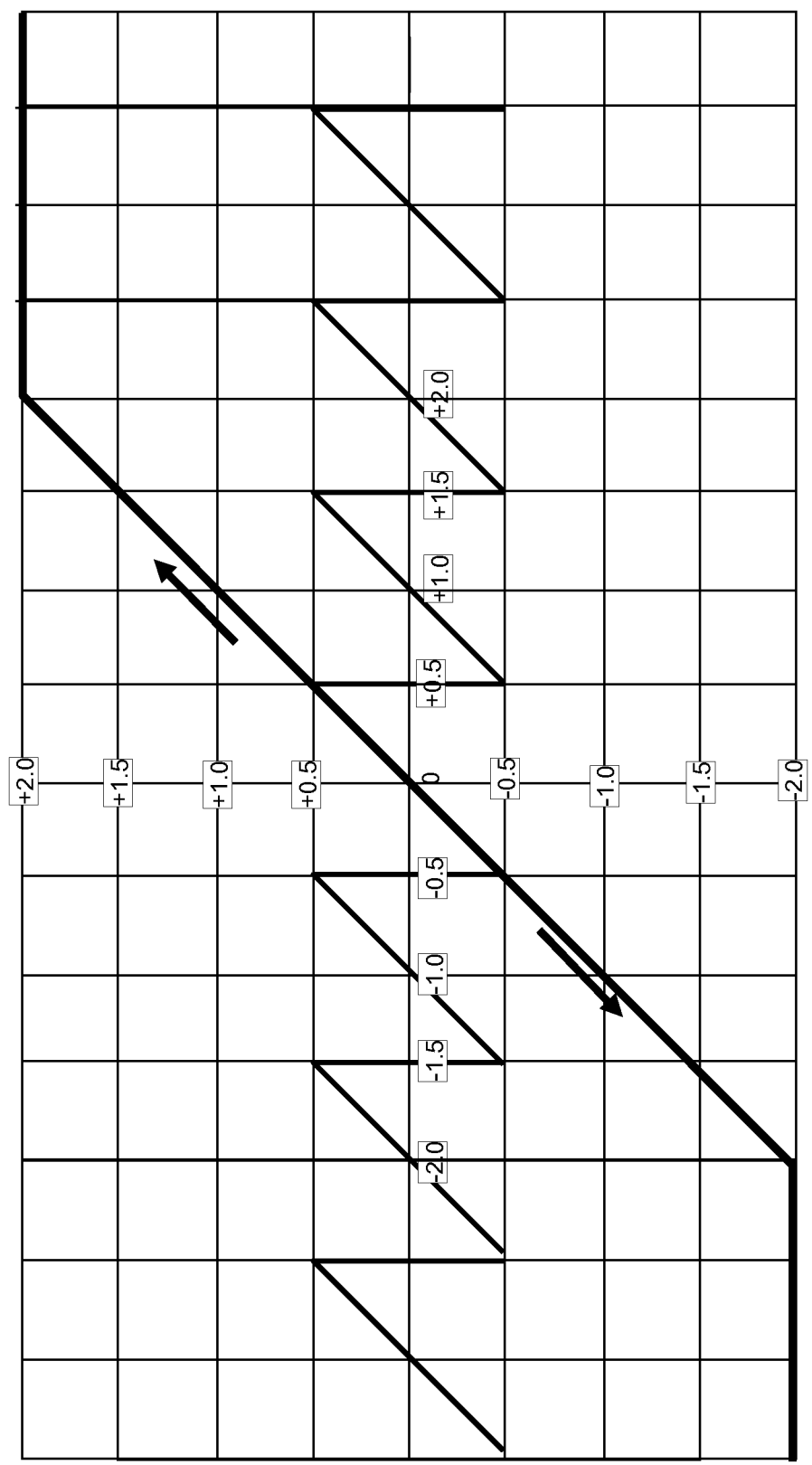
FIG. 14 shows a graph of the required phase detector output.

Unwrap block 125 removes discontinuities at +/−π radian intervals and allows the phase detector to track phase changes over multiple unit intervals as shown in FIG. 14 (a plot of Phase Detector Output (Unit Intervals (UI)) against Input Phase (UI)) which shows an idealized output. As shown in FIG. 14 the output should be linear since the signal is utilized as a feedforward signal to control Delay Element 113. Delay Element 113 cannot provide an infinite delay and so saturation block 126 saturates the signal at a predetermined value (2 unit intervals in FIG. 14).

The phase value output is split and may be adjusted 127, 128 according to tap weight phase detector 1202 as described below. The outputs 129, 1200 are utilised as inputs to the VCO 72 and Delay Element 113, respectively.

Figure 15:
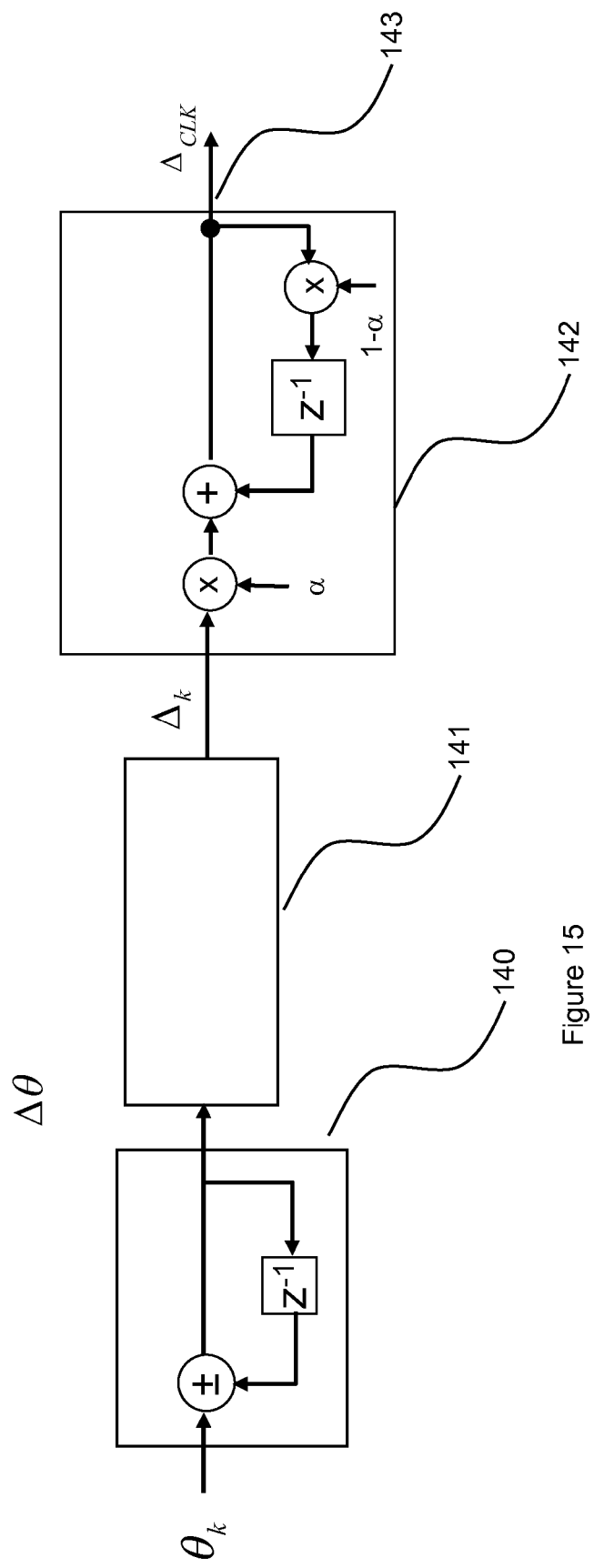
FIG. 15 shows a clock lock detecting system.

FIG. 15 shows a block diagram of a clock frequency offset monitor 1201 which may be provided to analyse and indicate whether the clock recovery system has locked to the received data signal. Successive phase values are compared at block 140 to give the phase change between those values. Block 141 performs an unwrap function to prevent false indications when the phase moves over an edge of the tan θ function. Infinite Impulse Response (IIR) filter 142 filters the signal resulting in a signal 143 indicating the offset between the received data clock and the local clock. When this value is stable, lock has been obtained. The indication of clock lock may be utilised by the processing system to control decoding of data or for general system control.

Figures 16A, 16B:
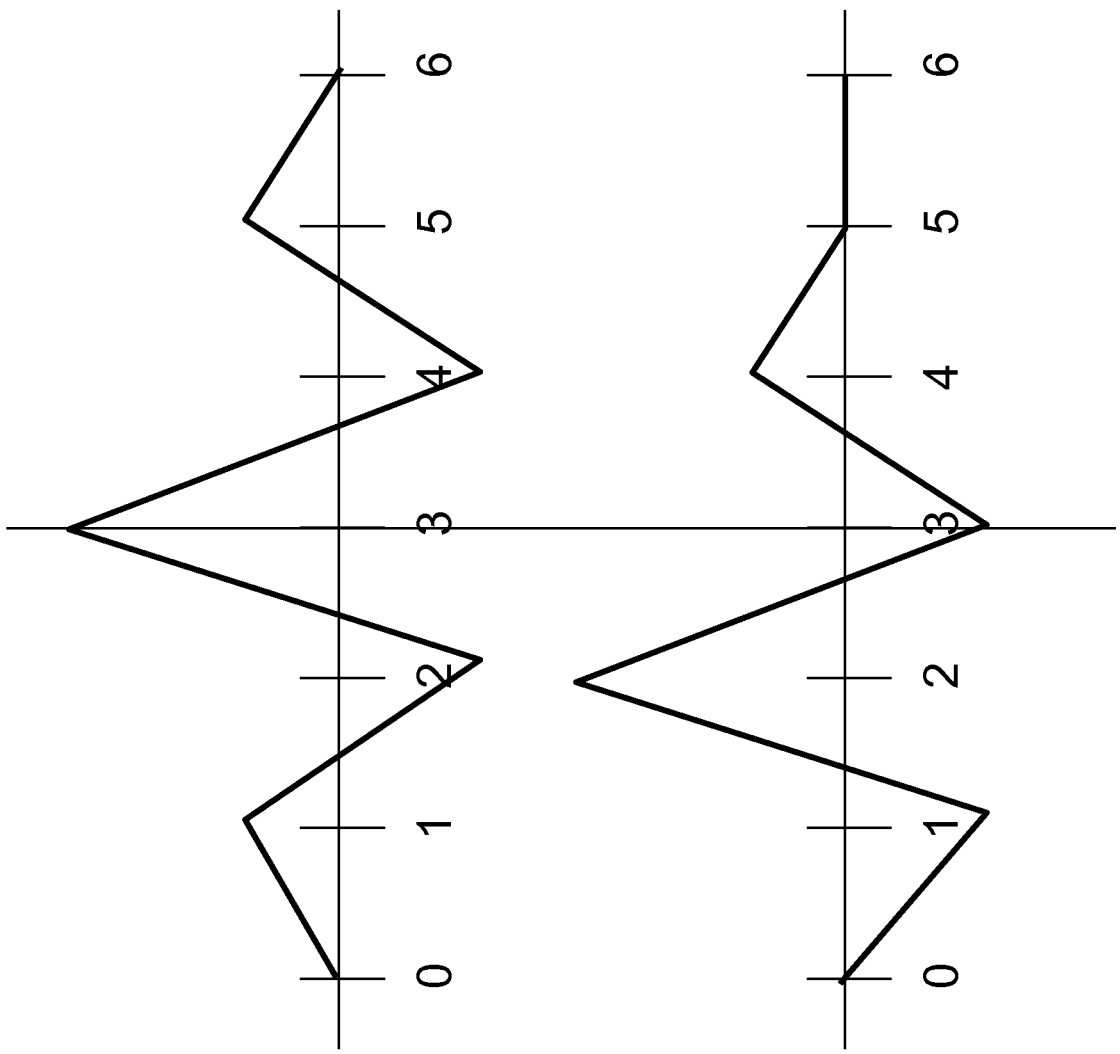
FIG. 16 shows examples of tap weights in an FIR filter.

FIR filters, such as those used in the equaliser, can act as variable delay elements by interpolating between samples. This occurs by the tap weights shifting to the left or the right. FIGS. 15a and 15b show plots of tap weights of an FIR filter, each having the same impulse response but the tap weights in FIG. 16b are shifted off-centre to introduce a delay compared to the weights in FIG. 16a. The centred weights shown in FIG. 16a are better able to correct for increased distortion than the off-centre ones shown in FIG. 16b, and therefore it is preferable for the tap weights to be centralised for optimum equaliser performance.

The equaliser 112, being an FIR, attempts to track and correct any slow clock phase drift which causes the tap weights to move from their central position. The off-centre tap weights are less able to equalise increased distortion and therefore system performance may be degraded. The slow clock phase drift should be corrected by the PLL, not the equaliser.

A tap weight phase detector 1202 is provided to monitor the centralisation of the tap weights and provide a correction signal indicative of the tap weight centre offset.

The correction signal output by tap weight phase detector 1202 is split for use by the VCO 72 and delay element 113. The signal for the VCO 72 passes to multiplier 1203 where it is multiplied by a coefficient $K_{tapPLL}$. The signal for the delay element passes to multiplier 1204 where it is multiplied by a coefficient $K_{tapDE}$. $K_{tapPLL}$ and $K_{tapDE}$ define the magnitude of the correction signal that is added to the phase value for the VCO 72 and Delay Element 113 respectively. Adders 127 and 128 add the correction signal to the phase signal for the VCO 72 and delay element 133 respectively.

In a first example, $K_{tapDE}$ is set to zero such that the correction signal is only applied to the VCO 72. In a second example, $K_{tapDE}$ may be non-zero such that the correction is applied to both the VCO 72 and Delay Element 133.

The correction signal applied to the VCO 72 (and Delay Element 113 if $K_{tapDE} \neq 0$) causes the tap weights to re-centralise under the action of the tap update system.

In an alternative implementation, the correction signal could be utilised to directly adjust the tap weights. The signal should be applied slowly to allow the VCO 72 and Delay Elements 133 to track the change thereby avoiding degradation of the equaliser performance.

The tap weight centre for the x-polarisation can be calculated using the following equation:—

$$\hat{n}_X = \frac{\sum_n n(|\bar{h}_{xx_n}|^2 + |\bar{h}_{yx_n}|^2)}{\sum_n (|\bar{h}_{xx_n}|^2 + |\bar{h}_{yx_n}|^2)}$$

Where $\bar{h}_{xx_n}$ and $\bar{h}_{yx_n}$ are the nth elements of the complex-valued sub matrices $\bar{h}_{xx}$ and $\bar{h}_{yx}$ for the X-X and Y-X filters respectively which equalise the X-polarisation:

$$\bar{w} = \begin{pmatrix} \bar{h}_{xx} \\ \bar{h}_{yx} \end{pmatrix}$$

A comparable equation is used for the Y-polarisation. The tap weight phase (the difference between the tap weight centre and the central tap) is then given by:—

$$\phi_{tapX} = n_{centre} - \hat{n}_X$$

Where $n_{centre}$ is the number of the central tap.

The tap weight phase is combined with the output of the phase detector, as shown in FIG. 13, to correct the phase of the VCO 72 and Delay Element 113, 1100, which in turn results in the tap weights moving to the centralised position. The tap weight phase signal output may be a combination of both the X and Y polarisations, or may be based on one or the other polarisation. It may be desirable to select from one or both polarisations depending on the relatively quality of the signals, or if one of the polarisations has not correctly acquired stable tap weights.

On startup of a transmission system the receiver has no knowledge of the correct clock phase or tap weights for the equaliser. For the phase detector to acquire the phase of the signal (and hence for the clock recovery system to operated) the equaliser must, at least to a certain degree, equalise the received signal. However, determination of the tap weights for the equaliser relies on the clock recovery system.

Figure 17:
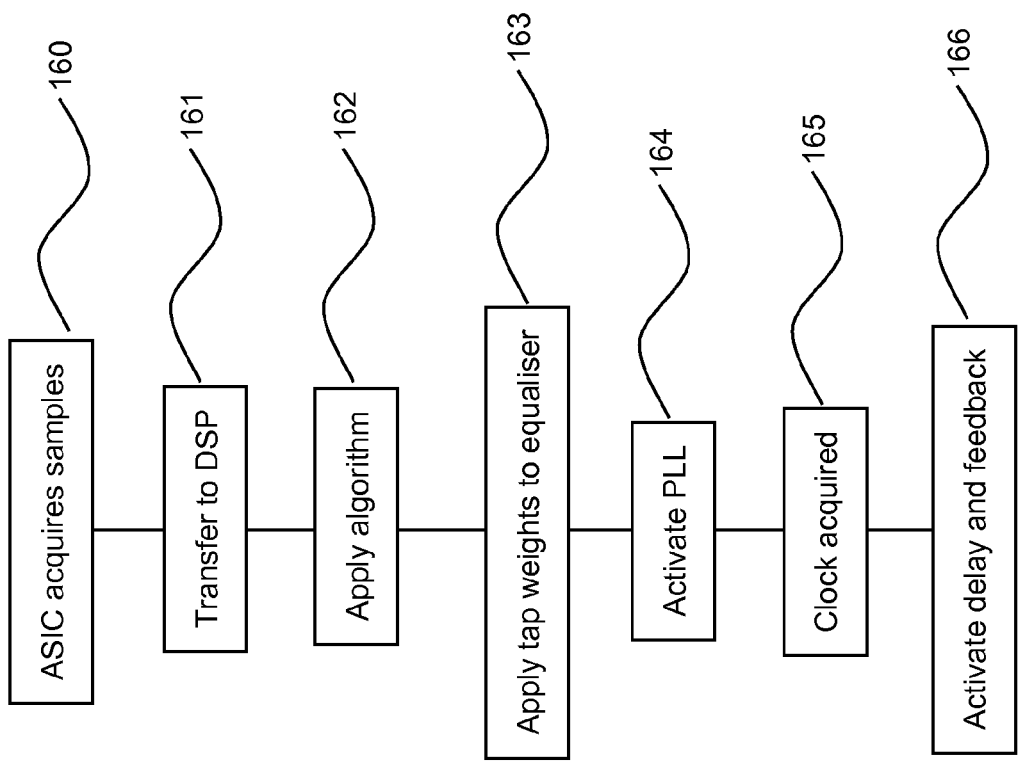
FIG. 17 shows a method of clock acquisition.

FIG. 17 shows a flow chart of a system for acquiring the clock phase and initial tap weights to allow startup of the system. FIG. 19 provides an alternative view of the methods of FIGS. 17 and 18 to exhibit the functions performed by each part of the system and the transfer of data between the ASIC and the DSP during the acquisition 187 and tracking 188 phases. Reference numerals on FIG. 19 relate to the blocks of FIGS. 17 and 18.

At block 160 a series of samples 180 of the data 183 is acquired by the ASIC 181. For example, 4000 samples may be acquired, which at a typical sample rate of two samples per symbol, gives 2000 symbols. At block 161 the series of samples is transferred to a Digital Signal Processor (DSP)

182 for processing according to the programming of that DSP. At block 162 the DSP applies a blind-optimisation algorithm to the samples 180 in order to identify an initial set of tap weights which may be used to equalise the incoming signal.

The use of a DSP 182 associated with the ASIC 181 for performing the algorithm is convenient as it may be programmed to perform the specific algorithms required. Since the algorithm need not be applied in real time there is a reduced requirement on the performance of the DSP 182 compared to the processing system which processes the received data in real time. Providing this function in the ASIC 181 is likely to be substantially more expensive and complex than utilising a DSP 182 and therefore the use of two devices may be more cost effective. However, the method can equally be applied within a single device if appropriate. In addition, ASIC implementations will typically work in a highly parallel manner, and the update rate $\mu$ may be limited by feedback delays. A non-real time implementation allows substantially higher update coefficients to be used, and the same data may be processed several times until the tap weights have converged. The use of a short block of data means that clock offsets (which may be 100-200 ppm) are not significant to prevent acquisition of an initial set of tap weights.

At block 163 the initial tap weights are transferred to the ASIC 181 and applied to the equaliser. The equaliser output is now a partially corrected signal from which the phase detector can operate. At block 164 the PLL is activated. Provided the channel is stable, the output of the equaliser will be valid and the PLL will acquire the clock at block 165 and will remove the clock offset.

Once the clock has been acquired, at block 166 the digital delay elements and decision-directed feedback systems are activated and the system enters tracking mode. Provided the initial tap estimates are sufficiently accurate the system will optimise the tap weights, PLL and delay elements. In order for this to succeed the tap weights must be sufficiently accurate for the decision directed update to function, which requires approximately $<\sim 10^{-2}$ BER.

Algorithms for the blind-compensation of DP-QPSK are known, for example as described in Raheli, R. & Picchi, G. (1991), *Synchronous and fractionally-spaced blind equalization in dually-polarized digital radio links*, in '*Communications*, 1991. *ICC 91, Conference Record. IEEE International Conference on*', pp. 156-161 vol. 1, incorporated herein by reference. A further known blind acquisition method which may be applicable in relation to the method of FIG. 17 is a constant modulus algorithm as described in Godard, D. (1980), '*Self-Recovering Equalization and Carrier Tracking in Two-Dimensional Data Communication Systems*', *Communications, IEEE Transactions on [legacy, pre*—1988] 28(11), 1867-1875, incorporated herein by reference.

The optimisation algorithm utilised in block 162 may be applied a number of times to the series of samples. A particularly efficient method is to apply the algorithm to the samples alternately forwards and backwards such that any clock offset is not relevant. The update coefficients used in the algorithm may be considerable higher than are utilised in a continual optimisation system as it is only desired to acquire an initial set of tap weights, not to provide continual performance. High update coefficients tend to lead to sporadic changes in tap weights and hence degradation in performance, but provide a more rapid convergence to the initial tap weights.

Prior to the tap weights being transferred to the ASIC they may be re-centred 184 by shifting the taps in response to a calculation of the tap weight centre, or by applying a shift using a digital interpolation function.

The method shown in FIG. 17 assumes that the acquisition phase, polarisation or channel model does not change significantly during the period of the acquisition. It is reasonable to assume that the polarisation and channel model does not change during this phase (approximately 20-500 ms), and a maximum clock offset of 250 ppm is reasonable. With that offset a drift of 0.5 unit intervals will occur in the 2000 symbols, which equates to a shift of 1 equaliser tap. This is not a significant shift and so the required assumptions are reasonable. If the assumptions are not met, then a new series of samples may be acquired and the process restarted.

Figure 18:
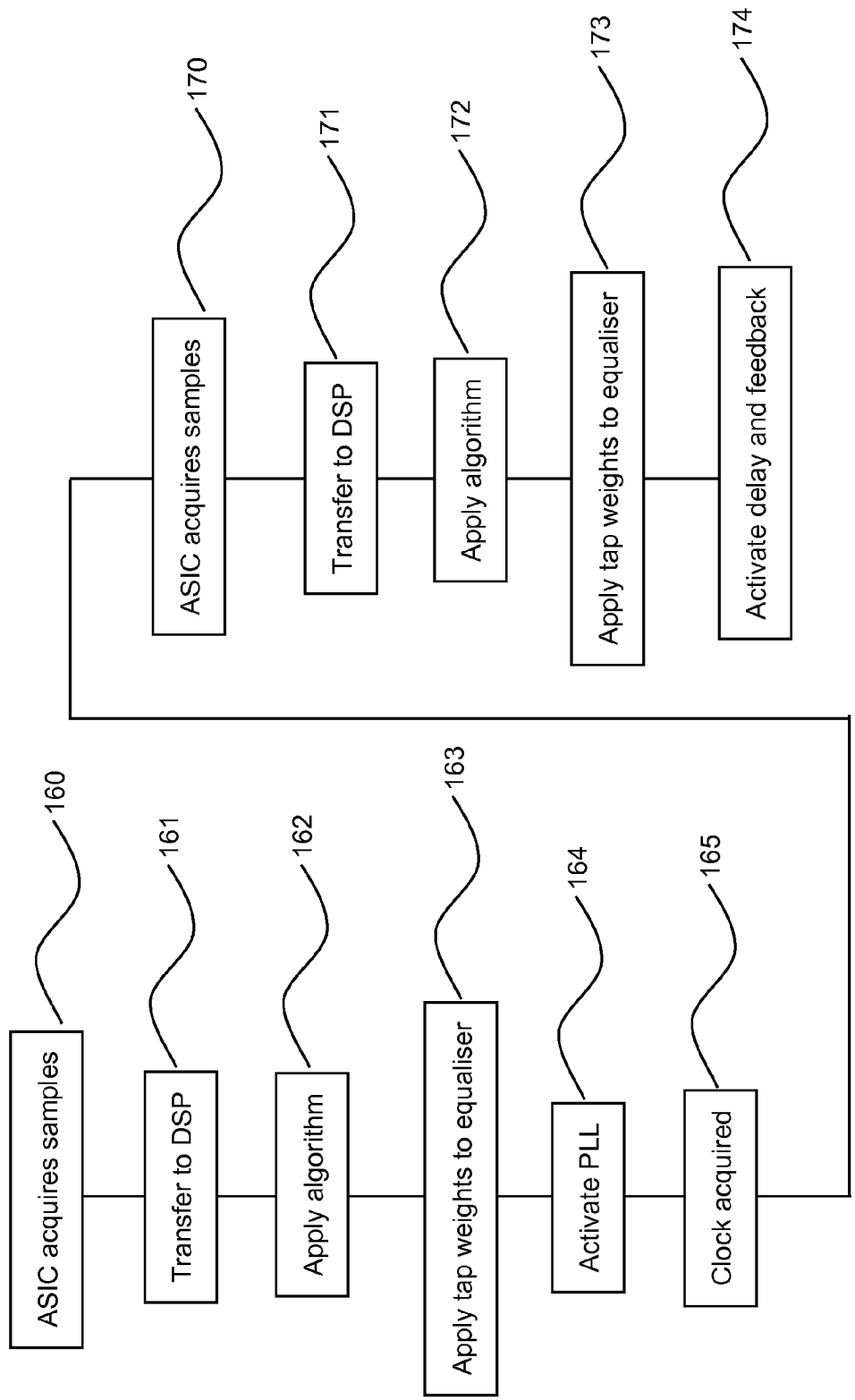
FIG. 18 shows an example of clock and tap weight acquisition.
Figure 19:
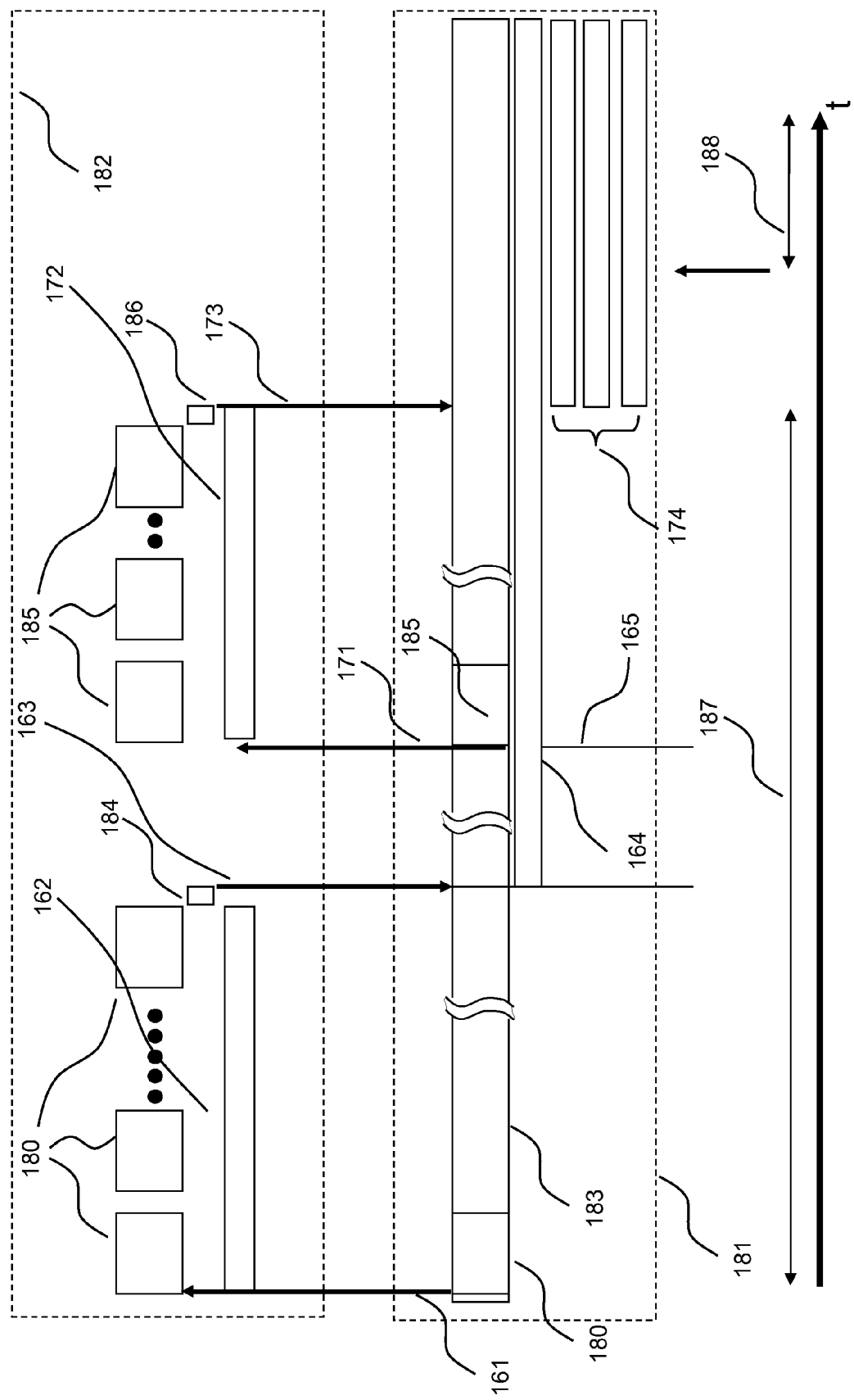
FIG. 19 shows a different view of the method of FIG. 18.

FIG. 18 shows a flow chart of an extension of the method of FIG. 17 to improve the equalisation before tracking mode is activated. After the clock has been acquired at block 165 a further series of samples 185 are acquired at block 170. At block 171 those samples 185 are transferred to the DSP 182 and again processed using the blind optimisation algorithm at block 172. Since the clock offset has been removed from this second series of samples a more accurate set of tap weights can be derived. At block 173 those tap weights (after optional recentering 186) are transferred to the equaliser and applied to the received signal.

At block 174 the decision-directed tracking and digital delay elements are activated and the receiver enters tracking mode. Frame detection may then be obtained and the system goes on to continuously track the channel.

All parameters and results given in the above description relate to a 40 Gbit/s DP-QPSK transmission system and are given to describe that system. All parameters may be modified in conventional manners as required based on the particular system being utilised without departing from the invention.

Where functions or algorithms have been described as being performed by a particular device or type of device, this is for example only and is not intended to be limiting in any way. As will be appreciated any suitable mode of implementation may be utilised as appropriate.

The blocks and demarcation between functions described above is given by way of example only, and as will be appreciated the functions may be demarked and distributed in any suitable way. Where a function has been described as being performed by a particular type of device (for example an ASIC) it will be appreciated that the principles described herein are also applicable to other methods of implementing those functions (for example in software running on a DSP).

The term Voltage Controlled Oscillator is used to describe a component which produces an output signal for clocking the ADCs in dependence on an input signal. As will be appreciated, it is not intended to restrict the component to one which is controlled directly by a varying voltage, but rather to describe the function of the component. For example, the component may equally be controlled by a digital signal indicating values.

Although not shown or described explicitly, it will be appreciated that, as is well known in the art for PLLs, a loop filter will be incorporated at a convenient location in the various PLLs described herein. That filter may be conveniently located in close proximity to the clock source, and may form part of the same device as that source. Alternatively, the filter may be located at any convenient location and provided by any convenient means.

The manner of implementation of the techniques described herein is dependent on the particular system and the implementation is within the capabilities of the skilled reader once they have been made aware of the functions required by this document.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices. Similarly DSP or ASIC is not intended to restrict the invention to any particular type of processing device, but those terms are simply used to refer to one possible implementation.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A receiver for receiving at least one input signal from a photodiode in an optical communications system, comprising a feedback path, a feedforward path, and a tap weight centralization system,
    the feedback path comprising:
        an analog-to-digital converter (ADC) configured to digitize the at least one input signal and output a digital signal;
        a Finite Impulse Response (FIR) filter to process the digital signal and output a processed signal;
        a phase detector configured to detect a timing phase of the processed signal and output a signal indicative of the timing phase; and
        a clock source configured to provide a sampling clock signal to the ADC, the clock source receiving as input the signal indicative of the timing phase of the processed signal to control the sampling clock signal;
    the feedforward path comprising:
        the phase detector; and
        a delay element configured to delay the processed signal and output a delayed processed signal, the delay of the delay element being controlled by the output of the phase detector; and
    the tap weight centralization system comprising:
        a tap weight phase detector to monitor tap weights of the FIR filter and generate a correction signal indicative of a tap weight center offset; and
        at least one adder to add the correction signal to the signal output by the phase detector that is indicative of the timing phase.

2. The receiver according to claim 1, wherein the FIR filter is configured to process the digital signal to correct distortion introduced by an optical transmission system.

3. The receiver according to claim 1, wherein the FIR filter comprises variable tap weights.

4. The receiver according to claim 3, wherein the FIR filter is configured to implement a tap weight update algorithm.

5. The receiver according to claim 3, wherein the feedforward path further comprises a low pass filter configured to filter the signal indicative of the timing phase to produce a filtered signal.

6. The receiver according to claim 5, wherein the FIR filter is coupled to the delay element to supply the filtered signal to the delay element as part of the feedforward path, and the signal indicative of the timing phase unfiltered by the FIR filter is supplied to the clock source as part of the feedback path.

7. The receiver according to claim 5, wherein the FIR filter is coupled to the delay element and clock source to supply the filtered signal to the delay element as part of the feedforward path and the clock source as part of the feedback path.

8. The receiver according to claim 1, wherein the clock source is implemented in a device with the at least one ADC.

9. The receiver according to claim 1, wherein the ADC and clock source are implemented in a first device and the FIR filter is implemented in a second device.

10. The receiver according to claim 9, wherein the second device is an application specific integrated circuit (ASIC).

11. The receiver according to claim 1, wherein the FIR filter processes the digital signal in real time.

12. The receiver according to claim 1, further comprising at least one photodiode configured to provide an input to the ADC.

13. The receiver according to claim 1, and comprising four ADCs.

14. The receiver according to claim 1, further comprising at least one photodiode, an optical local oscillator that is configured to generate an optical local oscillator signal and at least one optical hybrid configured to mix the optical local oscillator signal with a received optical signal, the at least one optical hybrid configured to output to an input of the at least one photodiode, wherein an output of the photodiode is supplied as the at least one input signal to the ADC.

15. The receiver according to claim 1, further comprising a carrier recovery system configured to operate on the processed signal output by the FIR filter.

16. The receiver according to claim 1, further comprising a decision system configured to decide values of received symbols.

17. The receiver according to claim 4, wherein the FIR filter is configured to implement the tap weight update algorithm based on inputs comprising a delayed version of the at least one input signal, a delay amount used to obtain the delayed version of the at least one input signal being the same as the delay applied by the delay element to the processed signal.

18. The receiver according to claim 1, wherein the phase detector is configured to select one or both of two signals derived from received optical signals having different polarizations.

19. The receiver according to claim 1, wherein the receiver is configured to receive, correct and decode a dual polarization quadrature phase shift keyed optical signal.

20. A method of receiving a modulated optical signal, comprising:
  receiving the modulated optical signal with at least one photodiode;
  operating a feedback path by:
    digitizing an output of the photodiode with an analog-to-digital converter (ADC) to generate an input signal for digital processing;
    processing the input signal with a Finite Impulse Response (FIR) filter having variable tap weights to correct for distortion in the modulated optical signal and outputting a processed signal;
    monitoring a timing phase of the processed signal and outputting a phase signal indicative of the timing phase; and
    based on the phase signal, controlling a clock source that outputs a clock signal to the ADC;
  operating a feedforward path by delaying the processed signal in accordance with the phase signal;
  operating a tap weight centralization system by:
    monitoring the variable tap weights of the FIR filter and generating a correction signal indicative of a tap weight center offset; and
    adding the correction signal to the phase signal indicative of the timing phase.

21. The method of claim 20, wherein processing comprises processing the input signal to correct distortion introduced by an optical transmission system.

22. The method of claim 20, further comprising updating the variable tap weights.

23. The method of claim 22, wherein updating the variable tap weights is based on a delayed version of the input signal.

24. The method of claim 22, wherein updating the variable tap weights comprises:
  utilizing the tap weight center offset to control a sampling clock phase of the analog-to-digital converter.

25. The method of claim 24, and further comprising generating the sampling clock phase by adding a signal indicative of the offset to a signal indicative of the timing phase of a signal output by the FIR filter.

26. The method of claim 20, further comprising initially acquiring tap weights for the FIR filter by:
  acquiring and storing a series of samples of a received optical signal;
  applying a blind optimization algorithm to the series of samples to obtain an estimate of tap weights for the FIR filter in order to equalize the received optical signal.

27. The method of claim 26, further comprising performing the blind optimization algorithm in both forwards and backwards directions to the series of samples.

28. The method of claim 26, further comprising:
  acquiring and storing a further series of samples of the received optical signal; and
  applying the blind optimization algorithm to the further series of samples to obtain an improved estimate of the tap weights.

29. The method of claim 28, further comprising applying the improved estimate of the tap weights to the FIR filter and correcting distortion in the received optical signal based on the improved estimate of the tap weights.

30. The method of claim 20, further comprising selecting one or both of two signals derived from received optical signals having different polarizations.

* * * * *